(12) United States Patent
Yang et al.

(10) Patent No.: US 12,136,210 B2
(45) Date of Patent: Nov. 5, 2024

(54) IMAGE PROCESSING METHOD AND APPARATUS

(71) Applicant: HUAWEI TECHNOLOGIES CO., LTD., Guangdong (CN)

(72) Inventors: Yun Yang, Shenzhen (CN); Songjiang Li, Shenzhen (CN); Bing Yu, Hangzhou (CN); Bailan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 399 days.

(21) Appl. No.: 17/530,688

(22) Filed: Nov. 19, 2021

(65) Prior Publication Data
US 2022/0076000 A1 Mar. 10, 2022

Related U.S. Application Data

(63) Continuation of application No. PCT/CN2020/086304, filed on Apr. 23, 2020.

(30) Foreign Application Priority Data

May 21, 2019 (CN) .......................... 201910421550.3

(51) Int. Cl.
*G06V 40/16* (2022.01)
*G06F 18/211* (2023.01)
(Continued)

(52) U.S. Cl.
CPC .......... *G06T 7/0012* (2013.01); *G06F 18/211* (2023.01); *G06N 3/045* (2023.01);
(Continued)

(58) Field of Classification Search
CPC ........... G06T 7/0012; G06T 3/02; G06T 5/50; G06T 2207/10004; G06T 2207/20081;
(Continued)

(56) References Cited

U.S. PATENT DOCUMENTS

| 8,457,363 B2 * | 6/2013 | Sung ...................... G06V 40/18 382/128 |
| 2006/0110030 A1 * | 5/2006 | Sung ...................... G06V 40/18 382/190 |
| 2016/0371537 A1 | 12/2016 | He |

FOREIGN PATENT DOCUMENTS

| CN | 104917963 A | 9/2015 | |
| CN | 106295533 A * | 1/2017 | ......... G06K 9/00281 |

(Continued)

OTHER PUBLICATIONS

Extended European Search Report issued in European Application No. 20808836.9 on Jun. 3, 2022, 12 pages.
Guo et al., "Digital Face Makeup by Example," 2009 IEEE Conference on Computer Vision and Pattern Recognition, Jun. 2009, 7 pages.
(Continued)

*Primary Examiner* — Carol Wang
(74) *Attorney, Agent, or Firm* — Fish & Richardson P.C.

(57) ABSTRACT

The present disclosure relates to image processing methods and apparatus. One example image processing method includes obtaining a face image, separately obtaining a left face image and a right face image based on the face image, inputting the left face image into a first target key point convolutional neural network model, outputting coordinates of a first left face key point, inputting the right face image into a second target key point convolutional neural network model, outputting coordinates of a first right face key point, and obtaining coordinates of a face key point of the face image based on the coordinates of the first left face key point and the coordinates of the first right face key point.

12 Claims, 28 Drawing Sheets

(51) Int. Cl.
  *G06N 3/045* (2023.01)
  *G06N 3/08* (2023.01)
  *G06T 3/02* (2024.01)
  *G06T 5/50* (2006.01)
  *G06T 7/00* (2017.01)
  *G06V 10/774* (2022.01)
  *G06V 10/82* (2022.01)
  *G06V 20/59* (2022.01)
  *G06V 40/20* (2022.01)

(52) U.S. Cl.
  CPC ............... *G06N 3/08* (2013.01); *G06T 3/02* (2024.01); *G06T 5/50* (2013.01); *G06V 10/774* (2022.01); *G06V 10/82* (2022.01); *G06V 20/597* (2022.01); *G06V 40/168* (2022.01); *G06V 40/171* (2022.01); *G06V 40/172* (2022.01); *G06V 40/20* (2022.01)

(58) Field of Classification Search
  CPC . G06T 2207/20084; G06T 2207/30201; G06F 18/211; G06N 3/045; G06N 3/08; G06N 3/048; G06V 10/774; G06V 10/82; G06V 20/597; G06V 40/168; G06V 40/171; G06V 40/172; G06V 40/20
  See application file for complete search history.

(56) References Cited

FOREIGN PATENT DOCUMENTS

| | | | |
|---|---|---|---|
| CN | 106951875 A | | 7/2017 |
| CN | 107958439 A | | 4/2018 |
| CN | 108062521 A | | 5/2018 |
| CN | 108121950 A | | 6/2018 |
| CN | 108898087 A | | 11/2018 |
| CN | 109344711 A | | 2/2019 |
| CN | 109800643 B | * | 3/2023 |
| JP | 2007151798 A | | 6/2007 |

OTHER PUBLICATIONS

Hanif et al., "Real-time Facial Feature Localization by Combining Space Displacement Neural Networks," Pattern Recognition Letters, vol. 29, No. 8, Jun. 2008, 11 pages.

Yang et al., "Detecting Faces in Images: A Survey," IEEE Transactions on Pattern Analysis and Machine Intelligence, vol. 24, No. 1, Jan. 2002, 25 pages.

Lv et al, "A Deep Regression Architecture with Two-Stage Re-initialization for High Performance Facial Landmark Detection," Proceedings of the IEEE conference on computer vision and pattern recognition, Jul. 2017, 10 pages.

PCT International Search Report and Written Opinion issued in International Application No. PCT/CN2020/086304 on Jul. 22, 2020, 15 pages (with English translation).

* cited by examiner

IMAGE PROCESSING METHOD AND APPARATUS

CROSS-REFERENCE TO RELATED APPLICATIONS

This application is a continuation of International Application No. PCT/CN2020/086304, filed on Apr. 23, 2020, which claims priority to Chinese Patent Application No. 201910421550.3, filed on May 21, 2019. The disclosures of the aforementioned applications are hereby incorporated by reference in their entireties.

TECHNICAL FIELD

Embodiments of this application relate to image processing technologies, and in particular, to an image processing method and apparatus.

BACKGROUND

With development of science and technology, face-related applications used for facial recognition, three-dimensional facial reconstruction, liveness detection, face beauty, emotion estimation, and the like have emerged one after another in recent years. Face key point detection is the basis of various face-related applications. The face key point detection (which may also be referred to as face alignment) refers to inputting a face image and obtaining predefined key point coordinates such as coordinates of corners of the eyes, corners of the mouth, the nose tip, and a face contour by using a computer vision algorithm. In other words, the face image is processed, to predict positions of some key points such as the eyes, the nose, and the mouth.

Various algorithms may be used to obtain the key point coordinates from the face image, for example, a regression-based method and a neural network-based method. Implementation of the foregoing process by using a convolutional neural network is widely used.

However, in an actual scenario, most of obtained face images have large posture amplitude or are blocked to some degree. When face key point detection is performed, by using the convolutional neural network, on the face image that has a large face posture or is blocked, a result may be inaccurate. In other words, coordinates of a face key point cannot be accurately determined.

SUMMARY

Embodiments of this application provide an image processing method and apparatus, to improve face key point positioning accuracy.

According to a first aspect, an embodiment of this application provides an image processing method. The method may include: obtaining a face image; separately obtaining a left face image and a right face image based on the face image, where sizes of the left face image and the right face image are the same as a size of the face image; inputting the left face image into a first target key point convolutional neural network model, and outputting coordinates of a first left face key point, where the first target key point convolutional neural network model is obtained after a key point convolutional neural network model is trained by using a left face image having key point information; inputting the right face image into a second target key point convolutional neural network model, and outputting coordinates of a first right face key point, where the second target key point convolutional neural network model is obtained after a key point convolutional neural network model is trained by using a right face image having key point information; and obtaining coordinates of a face key point of the face image based on the coordinates of the first left face key point and the coordinates of the first right face key point.

In this implementation, the left face image is processed by using the first target key point convolutional neural network model, and the right face image is processed by using the second target key point convolutional neural network model. Half-face positioning accuracy is high, and a structured feature of a face can be used, to improve face key point positioning accuracy.

In a possible design, the left face image having key point information and the right face image having key point information are obtained based on face images having different posture information. The face images having different posture information have corresponding key point information. The face images having different posture information include a face image having first posture information, a face image having second posture information, and a face image having third posture information. The first posture information is posture information used to indicate that a direction of a deflection angle of the face is leftward. The second posture information is posture information used to indicate that a direction of the deflection angle of the face is forward. The third posture information is posture information used to indicate that a direction of the deflection angle of the face is rightward.

In this implementation, the first target key point convolutional neural network model and the second target key point convolutional neural network model are obtained after the key point convolutional neural network models are trained by using the face images having different posture information. In this way, impact of the face images having different posture information on optimization of the key point convolutional neural network models can be balanced, and the face key point positioning accuracy can be effectively improved.

In a possible design, the obtaining coordinates of a face key point of the face image based on the coordinates of the first left face key point and the coordinates of the first right face key point may include: determining a first affine transformation matrix based on the coordinates of the first left face key point; obtaining a corrected left face image based on the first affine transformation matrix and the left face image; inputting the corrected left face image into a third target key point convolutional neural network model, and outputting corrected coordinates of the first left face key point; obtaining coordinates of a second left face key point based on the corrected coordinates of the first left face key point and an inverse transformation of the first affine transformation matrix; and obtaining the coordinates of the face key point of the face image based on the coordinates of the second left face key point and the coordinates of the first right face key point.

In this implementation, the left face image is processed by using the first target key point convolutional neural network model, the left face image is corrected based on an output result of the first target key point convolutional neural network model, and the corrected left face image is processed by using the third target key point convolutional neural network model. This may improve positioning accuracy of a left face key point, to further improve face key point positioning accuracy.

In a possible design, the obtaining coordinates of a face key point of the face image based on the coordinates of the first left face key point and the coordinates of the first right face key point may include: determining a second affine transformation matrix based on the coordinates of the first right face key point; obtaining a corrected right face image based on the second affine transformation matrix and the right face image; inputting the corrected right face image into a fourth target key point convolutional neural network model, and outputting corrected coordinates of the first right face key point; obtaining coordinates of a second right face key point based on the corrected coordinates of the first right face key point and an inverse transformation of the second affine transformation matrix; and obtaining the coordinates of the face key point of the face image based on the coordinates of the second right face key point and the coordinates of the first left face key point.

In this implementation, the right face image is processed by using the second target key point convolutional neural network model, the right face image is corrected based on an output result of the second target key point convolutional neural network model, and the corrected right face image is processed by using the fourth target key point convolutional neural network model. This may improve positioning accuracy of a right face key point, to further improve face key point positioning accuracy.

In a possible design, the obtaining coordinates of a face key point of the face image based on the coordinates of the first left face key point and the coordinates of the first right face key point may include: determining a first affine transformation matrix based on the coordinates of the first left face key point, and determining a second affine transformation matrix based on the coordinates of the first right face key point; obtaining a corrected left face image based on the first affine transformation matrix and the left face image, and obtaining a corrected right face image based on the second affine transformation matrix and the right face image; inputting the corrected left face image into a third target key point convolutional neural network model, and outputting corrected coordinates of the first left face key point; inputting the corrected right face image into a fourth target key point convolutional neural network model, and outputting corrected coordinates of the first right face key point; obtaining coordinates of a second left face key point based on the corrected coordinates of the first left face key point and an inverse transformation of the first affine transformation matrix; obtaining coordinates of a second right face key point based on the corrected coordinates of the first right face key point and an inverse transformation of the second affine transformation matrix; and obtaining the coordinates of the face key point of the face image based on the coordinates of the second left face key point and the coordinates of the second right face key point.

In this implementation, the left face image is processed by using the first target key point convolutional neural network model, the left face image is corrected based on an output result of the first target key point convolutional neural network model, and the corrected left face image is processed by using the third target key point convolutional neural network model. This may improve positioning accuracy of a left face key point. The right face image is processed by using the second target key point convolutional neural network model, the right face image is corrected based on an output result of the second target key point convolutional neural network model, and the corrected right face image is processed by using the fourth target key point convolutional neural network model. This may improve positioning accuracy of a right face key point. In this way, the face key point positioning accuracy is improved.

In a possible design, the method may further include: classifying a plurality of training samples based on the posture information, to obtain s training sample sets, where the training samples include the face image having key point information, selecting a plurality of training samples from at least three of the s training sample sets as training data; and training two key point convolutional neural network models by using the training data, to obtain the first target key point convolutional neural network model and the second target key point convolutional neural network model, where s is any integer greater than or equal to 3.

In this implementation, selection of the training data can improve a convergence speed and a training speed of the model. The training data is selected based on the posture information, so that the training data can balance impact of faces at various angles on model optimization, so as to improve face key point positioning accuracy. For example, positioning accuracy of a key point of a face image with a large deflection angle may be improved.

In a possible design, the obtaining a face image may include: collecting a to-be-processed image by using a photographing function or a shooting function of a terminal; and capturing the face image from the to-be-processed image.

In a possible design, the method may further include: determining a driver behavior based on the coordinates of the face key point, and determining, based on the driver behavior, whether to send an alarm signal.

In a possible design, the method may further include: adjusting the to-be-processed image based on the coordinates of the face key point and a beauty effect parameter, and displaying an adjusted to-be-processed image on an image preview interface. The beauty effect parameter includes at least one or a combination of a virtual decoration parameter, a face slimming parameter, an eye-size adjustment parameter, a skin smoothing and acne removal parameter, a skin whitening parameter, a tooth whitening parameter, and a blush parameter.

In a possible design, before the displaying an adjusted to-be-processed image, the method may further include: obtaining a key point face image based on the coordinates of the face key point and the face image, where the key point face image is labeled with the face key point; displaying the key point face image on the image preview interface; and receiving a key point adjustment instruction input by a user, where the key point adjustment instruction is used to indicate an adjusted face key point. The adjusting the to-be-processed image based on the coordinates of the face key point and a beauty effect parameter may include: adjusting the to-be-processed image based on the adjusted face key point and the beauty effect parameter.

In a possible design, the method may further include: performing facial recognition based on the coordinates of the face key point.

In a possible design, the performing facial recognition based on the coordinates of the face key point may include: performing feature extraction on the face image based on the coordinates of the face key point, to obtain a face image feature; matching the face image feature with a feature template in a database; and outputting a recognition result.

According to a second aspect, an embodiment of this application provides an image processing method. The method may include: obtaining, based on face images having different posture information, a left face image having key point information and a right face image having key point information, where the face images having different posture information have corresponding key point information; training a key point convolutional neural network model by using the left face image having key point information, to obtain a first target key point convolutional neural network model, where the first target key point convolutional neural network model is used to process an input left face image and output coordinates of a left face key point; and training a key point convolutional neural network model by using the right face image having key point information, to obtain a second target key point convolutional neural network model, where the second target key point convolutional neural network model is used to process an input right face image and output coordinates of a right face key point. The posture information is used to reflect a deflection angle of a face.

In a possible design, the face images having different posture information include a face image having first posture information, a face image having second posture information, and a face image having third posture information. The first posture information is posture information used to indicate that a direction of the deflection angle of the face is leftward. The second posture information is posture information used to indicate that a direction of the deflection angle of the face is forward. The third posture information is posture information used to indicate that a direction of the deflection angle of the face is rightward.

In a possible design, the method may further include: classifying a plurality of training samples based on the posture information, to obtain s training sample sets, where the training samples include the face image having key point information; and selecting a plurality of training samples from at least three of the s training sample sets as the face images having different posture information, where s is any integer greater than or equal to 3.

According to a third aspect, an image processing apparatus is provided. The apparatus may be a terminal device, or may be a chip in a terminal device. The apparatus has a function of implementing a terminal device in the foregoing embodiments. The function may be implemented by hardware, or may be implemented by hardware executing corresponding software. The hardware or the software includes one or more units corresponding to the function.

In a possible design, when the apparatus is a terminal device, the apparatus may include an obtaining module and a processing module. The obtaining module and the processing module may be, for example, a processor. The obtaining module may be connected to a transceiver module. The transceiver module may be, for example, a transceiver, and the transceiver may include a radio frequency circuit and a baseband circuit.

Optionally, the apparatus may further include a storage unit, and the storage unit may be, for example, a memory. When the apparatus includes the storage unit, the storage unit is configured to store computer-executable instructions. The obtaining module and the processing module are connected to the storage unit. The obtaining module and the processing module execute the computer-executable instructions stored in the storage unit, to enable the terminal device to perform the foregoing image processing methods related to the function of the terminal device.

In another possible design, when the apparatus is a chip in a terminal device, the chip includes a processing module and a transceiver module. The processing module may be, for example, a processor, and the transceiver module may be, for example, an input/output interface, a pin, or a circuit on the chip. Optionally, the apparatus may further include a storage unit. The processing module may execute computer-executable instructions stored in the storage unit, to enable the chip in the terminal device to perform the image processing method related to the function of the terminal device in any one of the foregoing aspects.

Optionally, the storage unit may be a storage unit, for example, a register or a cache, in the chip. Alternatively, the storage unit may be a storage unit in the terminal device but outside the chip, for example, a read-only memory (read-only memory, ROM for short), another type of static storage device that can store static information and instructions, or a random access memory (random access memory, RAM for short).

The processor mentioned anywhere above may be a general-purpose central processing unit (Central Processing Unit, CPU for short), a microprocessor, an application-specific integrated circuit (application-specific integrated circuit, ASIC for short), or one or more integrated circuits configured to control program execution of the image processing methods in the foregoing aspects.

According to a fourth aspect, this application provides an image processing apparatus. The apparatus may be a training device, or may be a chip in a training device. The apparatus has a function of implementing embodiments related to the training device in the foregoing aspects. The function may be implemented by hardware, or may be implemented by hardware executing corresponding software. The hardware or the software includes one or more units corresponding to the function.

In a possible design, when the apparatus is a training device, the apparatus may include a processing module and a transceiver module. The processing module may be, for example, a processor. The transceiver module may be, for example, a transceiver, and the transceiver includes a radio frequency circuit. Optionally, the apparatus further includes a storage unit, and the storage unit may be, for example, a memory. When the apparatus includes the storage unit, the storage unit is configured to store computer-executable instructions, and the processing module is connected to the storage unit. The processing module executes the computer-executable instructions stored in the storage unit, to enable the apparatus to perform the image processing method related to the training device in any one of the foregoing aspects.

In another possible design, when the apparatus is a chip in a training device, the chip includes a processing module and a transceiver module. The processing module may be, for example, a processor, and the transceiver module may be, for example, an input/output interface, a pin, or a circuit on the chip. The processing module may execute computer-executable instructions stored in a storage unit, to enable the chip in the training device to perform the image processing methods related to the training device in the foregoing aspects. Optionally, the storage unit is a storage unit in the chip, for example, a register or a buffer. Alternatively, the storage unit may be a storage unit in the training device but outside the chip, for example, a ROM, another type of static storage device that can store static information and instructions, or a RAM.

The processor mentioned anywhere above may be a CPU, a microprocessor, an ASIC, or one or more integrated circuits configured to control program execution of the foregoing image processing methods.

According to a fifth aspect, a computer storage medium is provided. The computer storage medium stores program code, and the program code is used to indicate instructions of performing the method according to either of the first aspect and the second aspect or any possible implementation thereof.

According to a sixth aspect, a processor is provided. The processor is configured to be coupled to a memory, and is configured to perform the method according to either of the first aspect and the second aspect or any possible implementation thereof.

According to a seventh aspect, a computer program product including instructions is provided. When the computer program product runs on a computer, the computer is enabled to perform the method according to either of the first aspect and the second aspect or any possible implementation thereof.

According to the image processing method and apparatus in the embodiments of this application, a face image is obtained, the face image is input into a target key point convolutional neural network model, and coordinates of a face key point are output. The target key point convolutional neural network model is obtained after a key point convolutional neural network model is trained by using face images having different posture information, and the posture information is used to reflect a deflection angle of a face. This may improve face key point positioning accuracy.

BRIEF DESCRIPTION OF DRAWINGS

The following briefly describes the accompanying drawings for describing embodiments or the conventional technology.

FIG. 7C-1 to FIG. 7C-3 and FIG. 7D are schematic diagrams of a network structure of a ResNet 50 according to an embodiment of this application;

FIG. 12B-1 and FIG. 12B-2 are a schematic diagram of another image processing method according to an embodiment of this application;

DESCRIPTION OF EMBODIMENTS

The following describes some terms in this application, to help persons skilled in the art have a better understanding.

Figure 1:
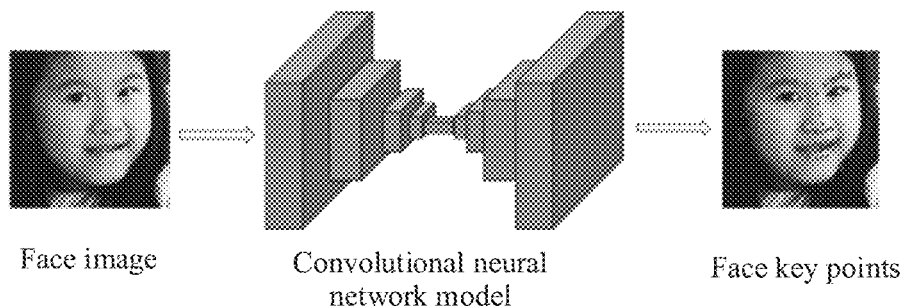
FIG. 1 is a schematic diagram of a face key point according to an embodiment of this application.

A face key point is a point used to position a key area of a face in a face image. The key area includes areas such as eyebrows, eyes, the nose, the mouth, and a face contour. For example, as shown in FIG. 1, face key points are points labeled in the figure.

Face key point detection, which is also referred to as face key point positioning or face alignment, refers to processing an input face image to determine the face key point. A manner of determining the face key point may be processing the input face image by using a data mining model to determine the face key point. The data mining model may be a neural network model, for example, a convolutional neural network model. The convolutional neural network model is used as an example. As shown in FIG. 1, a face image is input into the convolutional neural network model, and the convolutional neural network model outputs coordinates of face key points, namely, coordinates of the points labeled in FIG. 1.

Figure 2:
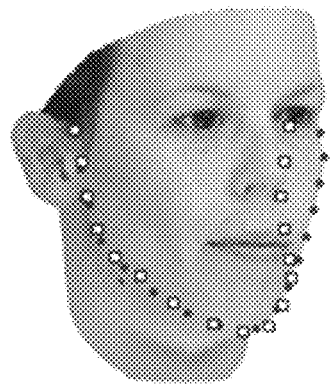
FIG. 2 is a schematic diagram of two-dimensional and three-dimensional face key points according to an embodiment of this application.

The face key point positioning may be classified into face key point positioning in a two-dimensional perspective and face key point positioning in a three-dimensional perspective. As shown in FIG. 2, a circular labeling point represents a position of a face key point in the two-dimensional perspective. In other words, when a face has a large angle, some key points are invisible. For the face key point positioning in the two-dimensional perspective, only a visible position in an image is considered for labeling. Different from that in the face key point positioning in the two-dimensional perspective, a face key point in the three-dimensional perspective is shown in FIG. 2, and a square labeling point represents a position of the face key point in the three-dimensional perspective. For a large-angle face, real coordinates of an invisible key point also need to be estimated. A face key point in the following embodiments of this application is a key point in the two-dimensional perspective.

The convolutional neural network (Convolutional Neural Network, CNN) model is a feedforward neural network model. An artificial neuron of the neural network model may respond to a peripheral unit in a part of coverage area, and may perform image processing by using a CNN. The convolutional neural network model may include one or more convolutional layers and a top fully-connected layer, and may further include an association weight and a pooling layer (pooling layer). Compared with other deep learning structures, the convolutional neural network model can provide better results in image and speech recognition. This model may alternatively be trained by using a backpropagation algorithm. Compared with other deep and feedforward neural networks, the convolutional neural network model needs to estimate fewer parameters. In the embodiments of this application, the convolutional neural network model is used as an example for description. This is not limited in this application. Parameters (such as a weight parameter and a bias parameter) of the convolutional neural network model are used to represent the convolutional neural network model. Different convolutional neural network models have different parameters and different processing performance.

A training device may train the convolutional neural network model by using training data. The training device includes a processor, a hard disk, a memory, a system bus, and the like. The convolutional neural network model in this application is specifically a convolutional neural network model used to implement the face key point positioning, and may be referred to as a key point convolutional neural network model.

A training process of the key point convolutional neural network model specifically refers to adjusting a parameter of the model by learning the training data, so that an output of the convolutional neural network model is as close as possible to a target value. For example, the target value is correct coordinates of a face key point.

It should be noted that, for a network structure of the key point convolutional neural network model in this application, refer to a convolutional neural network model in the conventional technology. A difference between this application and the conventional technology lies in that training as described in the following embodiments is performed on the key point convolutional neural network model, to obtain a target key point convolutional neural network model. "Adjusting a key point convolutional neural network model" in the embodiments of this application refers to adjusting parameters such as a weight parameter and a bias parameter involved in the network model.

A training sample includes a face image having key point information. For example, the face image having key point information may include the face image and coordinates of a corresponding face key point. In other words, a representation form of the key point information in the embodiments of this application may be coordinates of a face key point. The coordinates of the face key point correspond to a face image, and are used to identify a key point in the face image. In the embodiments of this application, a plurality of training samples are classified based on a deflection angle of a face. For example, face images deflecting leftward are classified as one type and form a training sample set, face images deflecting rightward are classified as one type and form a training sample set, and face images facing forward are classified as one type and form a training sample set. That is, there are three training sample sets. Certainly, it may be understood that a quantity of training sample sets may be flexibly set based on a requirement, so as to classify the training samples and obtain the corresponding quantity of training sample sets.

The training data includes one or more training samples, and the one or more training samples may be from a same training sample set or different training sample sets. The training data is used to train the key point convolutional neural network model. The training data in the embodiments of this application may also be referred to as minibatch (minibatch) data. In the embodiments of this application, the training data is constructed based on posture information of a face image. For a specific construction process of the training data, refer to specific descriptions in the following embodiments.

The posture information is used to reflect information about the deflection angle of the face. For example, the face deflects leftward by 15 degrees or deflects rightward by 25 degrees.

A terminal may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a radio access network (Radio Access Network, RAN). The wireless terminal may be a mobile terminal, for example, a mobile phone (also referred to as a "cellular" phone) or a computer with a mobile terminal. For example, the wireless terminal may be a portable, pocket-sized, handheld, computer built-in, or vehicle-mounted mobile apparatus, which exchanges voice and/or data with the radio access network. For example, the wireless terminal may be a device such as a personal communications service (Personal Communications Service, PCS) phone, a cordless telephone, a session initiation protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a remote station (Remote Station), a remote terminal (Remote Terminal), an access terminal (Access Terminal), a user terminal (User Terminal), a user agent (User Agent), or a user device (User Device or User Equipment). This is not limited herein.

"A plurality of" in this application refers to two or more than two. The term "and/or" describes an association for describing associated objects and represents that three relationships may exist. For example, A and/or B may represent the following three cases: Only A exists, both A and B exist, and only B exists. The character "/" generally indicates an "or" relationship between the associated objects.

Figure 3A:
FIG. 3A is a schematic diagram of a network architecture of an image processing method according to an embodiment of this application.

FIG. 3A is a schematic diagram of a network architecture of an image processing method according to an embodiment of this application. As shown in FIG. 3A, the network architecture includes a training device and a model application device. The training device uses face images having different posture information to train a key point convolutional neural network model, to obtain a target key point convolutional neural network model. The model application device is a device that performs image processing by using the target key point convolutional neural network model in this embodiment of this application. The model application device may be any specific form of the foregoing terminal. The image processing method in this application may include: In a training phase, the training device trains the key point convolutional neural network model by using the face images having different posture information and coordinates of corresponding key points, to obtain the target key point convolutional neural network model. In a model using phase, in an implementation, the target key point convolutional neural network model is stored in the model application device. The model application device collects an image, processes the collected image by using the target key point convolutional neural network model, and outputs coordinates of a face key point, so that the model application device performs a subsequent processing process on the collected image based on the coordinates of the face key point. For example, the subsequent processing process may be face matching processing (applied to facial recognition).

Figure 3B:
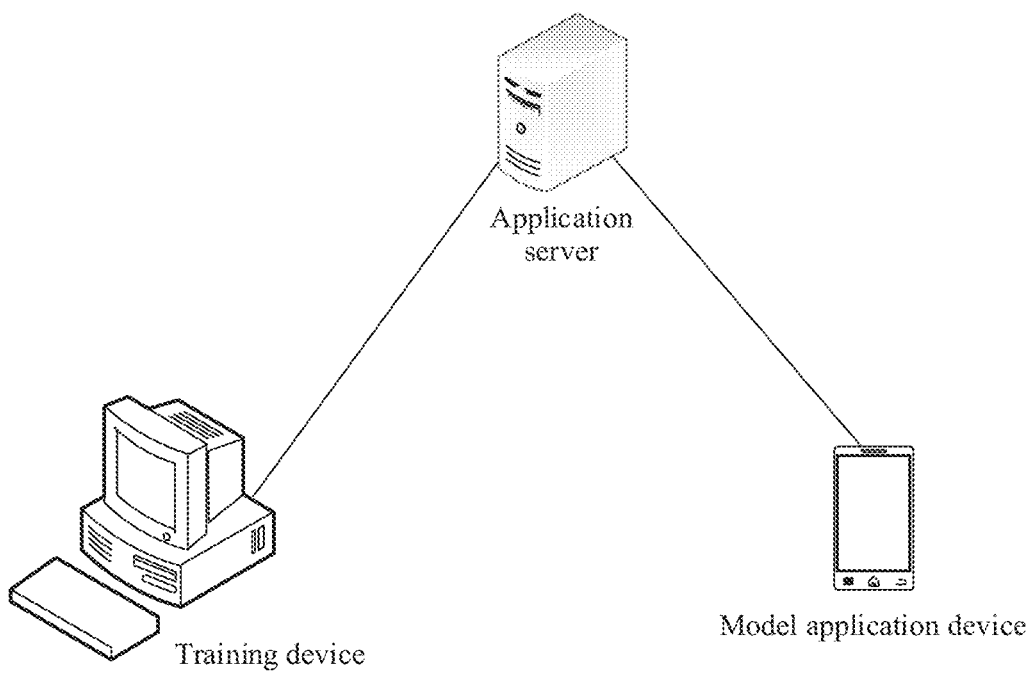
FIG. 3B is a schematic diagram of another network architecture of an image processing method according to an embodiment of this application.

FIG. 3B is a schematic diagram of another network architecture of an image processing method according to an embodiment of this application. As shown in FIG. 3B, the network architecture includes a training device, an application server, and a model application device. In a training phase, the training device uses face images having different posture information and coordinates of corresponding face key points to train a key point convolutional neural network model, to obtain a target key point convolutional neural network model. In a model using phase, the target key point convolutional neural network model is stored in the application server. In an implementation, the application server may send the target key point convolutional neural network model to the model application device. The model application device collects an image, processes the collected image by using the target key point convolutional neural network model, and outputs coordinates of a face key point. The model application device performs a subsequent processing process on the collected image based on the coordinates of the face key point. For example, the subsequent processing process may be face matching processing (applied to facial recognition). In another implementation, the model application device collects an image, sends the collected image to the application server. The application server processes the image by using the target key point convolutional neural network model, and outputs coordinates of a face key point. The application server performs a subsequent processing process on the collected image based on the coordinates of the face key point, where, for example, the subsequent processing process may be face matching processing (applied to facial recognition), and sends a processing result to the model application device.

It may be understood that the training device and the model application device may be two separate devices, or may be one device, for example, a terminal in any one of the foregoing specific forms. The training device and the application server may be two separate devices, or may be one device, for example, a server. This is not limited in this application.

The following describes specific implementation processes of training data construction and model training.

(1) Training Data Construction

In this embodiment of this application, training data is constructed based on posture information of face images of training samples, and the training data is used to train a key point convolutional neural network. The training data includes training samples having different posture information, that is, face images having different posture information and coordinates of corresponding face key points. The model is trained by using the training samples having different posture information, so that impact of the face images having different posture information on optimization of the key point convolutional neural network model can be balanced, and face key point positioning accuracy of a target convolutional neural network model obtained through training can be improved. In addition, because the training data is selected, a gradient descent direction in a model training process may be more accurate.

In an implementation, the face images having different posture information may include a face image having first posture information, a face image having second posture information, and a face image having third posture information. The first posture information is posture information used to indicate that a direction of a deflection angle of a face is leftward. The second posture information is posture information used to indicate that a direction of the deflection angle of the face is forward. The third posture information is posture information used to indicate that a direction of the deflection angle of the face is rightward. The face image having the first posture information may include face images with different leftward deflection degrees, for example, a face image with a leftward deflection of 10 degrees or a face image with a leftward deflection of 20 degrees. Examples are not provided for description herein one by one. The face image having the third posture information may include face images with different rightward deflection degrees, for example, a face image with a rightward deflection of 10 degrees or a face image with a rightward deflection of 20 degrees. Examples are not provided for description herein one by one.

The following uses a specific embodiment to explain and describe a training data construction process.

Figure 4A:
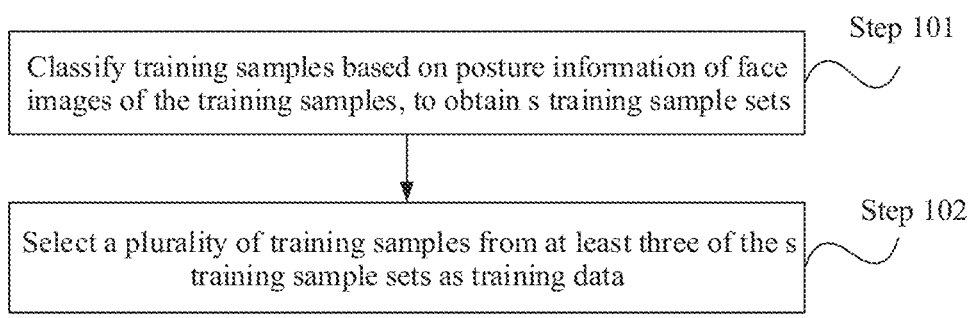
FIG. 4A is a schematic diagram of a training data construction process of an image processing method according to an embodiment of this application.
Figure 4B:
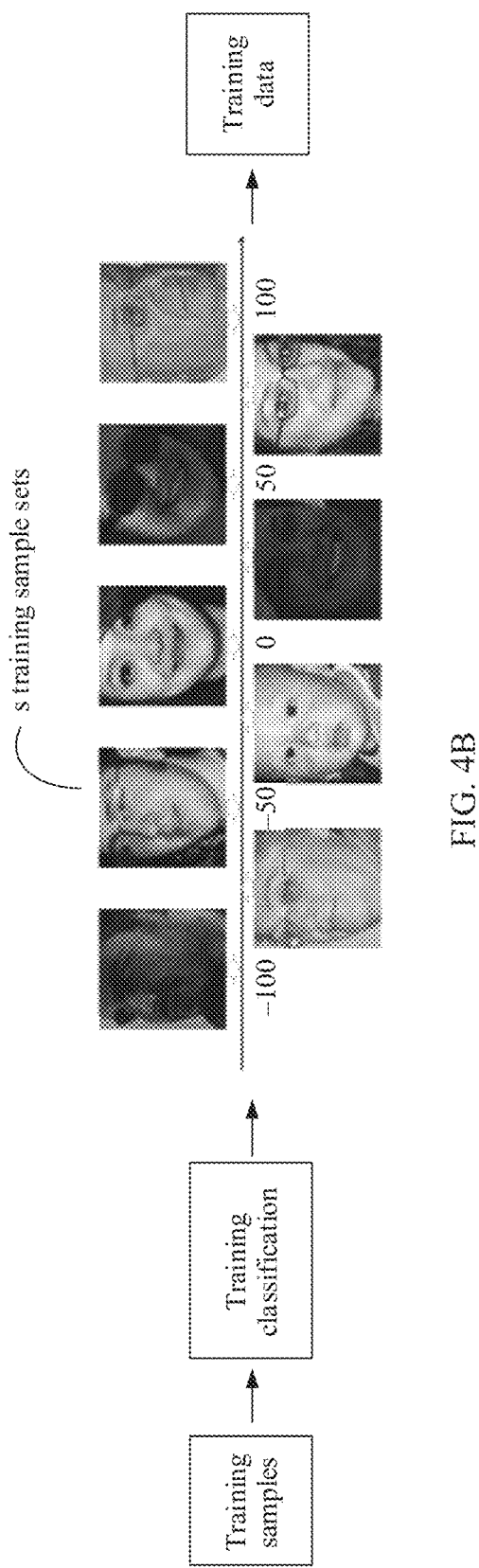
FIG. 4B is a schematic diagram of training data construction in an image processing method according to an embodiment of this application.

FIG. 4A is a schematic diagram of a training data construction process of the image processing method according to an embodiment of this application. FIG. 4B is a schematic diagram of training data construction in the image processing method according to an embodiment of this application. As shown in FIG. 4A, the training data construction may include the following steps:

Step 101: Classify training samples based on posture information of face images of the training samples, to obtain s training sample sets.

As described above, the training sample includes a face image and coordinates of a corresponding face key point. For a large quantity of training samples, the training samples are collected from various complex scenarios, and the training samples may be classified based on posture information. The posture information is used to reflect information about the deflection angle of the face. For example, the posture information is p, and a value range of p is [−100, 100]. A negative value indicates a leftward deflection, and a positive value indicates a rightward deflection.

In an implementation of obtaining posture information of a face image in each training sample, coordinates of a face key point of each face image are input into a generalized Procrustes analysis (Generalized Procrustes Analysis, GPA) algorithm, and adjusted coordinates of the face key point are output. The adjusted coordinates of the face key point are input into a principal component analysis (Principal Component Analysis, PCA) algorithm. A dimension reduction operation is performed on the adjusted coordinates of the face key point by using the PCA algorithm, to output a p value of each training sample. The p value is used to represent the posture information.

Adjustment of the coordinates of the face key point by using the GPA algorithm is described. The GPA algorithm may align face images of all training samples to an average face image (for example, a standard front face image). For example, at least one of rotation, translation, and scaling processing is performed on each face image, so that a processed face image is located near the average face image, and a mean square error (Mean Square Error, MSE) between the processed face image and the average face image is minimum.

Figure 5A:
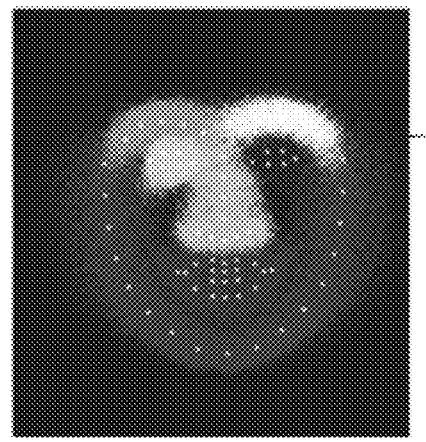
FIG. 5A is a schematic diagram of distribution of face key points of a training sample that is not processed by using a GPA algorithm according to an embodiment of this application.
Figure 5B:
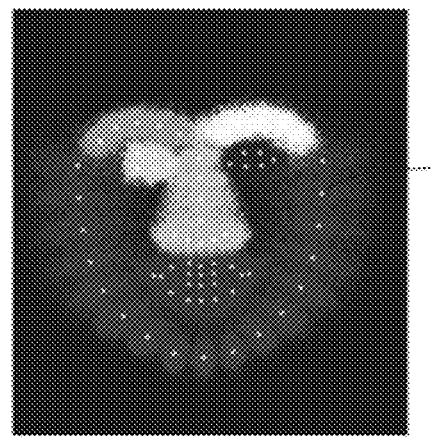
FIG. 5B is a schematic diagram of distribution of face key points after a GPA algorithm is used in an image processing method according to an embodiment of this application.

A processing effect of the GPA algorithm is described. FIG. 5A is a schematic diagram of distribution of face key points of a training sample that is not processed by using the GPA algorithm according to an embodiment of this application, and FIG. 5B is a schematic diagram of distribution of face key points after the GPA algorithm is used in the image processing method according to an embodiment of this application. An example in which each face image has 68 face key points is used for description. As shown in FIG. 5A, face key points of a plurality of training samples that are not processed by using the GPA algorithm are distributed near face key points of the average face image, and the distribution is relatively disorderly. It can be learned that postures of face images of the training samples are different, and a posture difference is relatively large. However, as shown in FIG. 5B, face key points of a plurality of training samples processed by using the GPA algorithm are distributed near the face key points of the average face image. The distribution presents an ellipse and has an aggregation effect. It can be learned that, by using the GPA algorithm, an MSE between a face image of a training sample and the average face image may be minimized, so that accuracy of subsequent face key point processing may be improved.

Processing of the adjusted coordinates of the face key point by using the PCA algorithm is described. The dimension reduction operation is performed on the adjusted coordinates of the face key point by using the PCA algorithm, to output the p value of each training sample. It should be noted that a principal component is one-dimensional in this embodiment of this application. It may be understood that the principal component may alternatively be multi-dimensional. In this embodiment of this application, the principal component is not limited to be one-dimensional. After the PCA algorithm is used, a coordinate length (2L, where L is a quantity of key points) of the face key points of each face image is converted into a number p.

Based on the p value, the training samples in this embodiment of this application are divided into s small data sets, namely, s training sample sets T1 to Ts. Each small data set includes a specific quantity of training samples. Each training sample set represents face images that meets a specific angle condition.

For example, a value of s is 3. A plurality of training samples are classified based on the posture information, to obtain three training sample sets. One training sample set includes a face image having the first posture information and corresponding face key points, one training sample set includes a face image having the second posture information and corresponding face key points, and the other training sample set includes a face image having the third posture information and corresponding face key points. A plurality of training samples may be selected from the three training sample sets and used as the training data to train the key point convolutional neural network model.

For another example, a value of s is 5. A plurality of training samples are classified based on the posture information, to obtain five training sample sets. The first training sample set and the second training sample set include face images having the first posture information and corresponding face key points, the third training sample set includes a face image having the second posture information and corresponding face key points, and the fourth training sample set and the fifth training sample set include face images having the third posture information and corresponding face key points. A p value of the face image in the first training sample set is less than −50. A p value of the face image in the second training sample set is greater than or equal to −50. A p value of the face image in the fifth training sample set is greater than 50 degrees. A p value of the face image in the fourth training sample set is less than or equal to 50 degrees.

Figure 6:
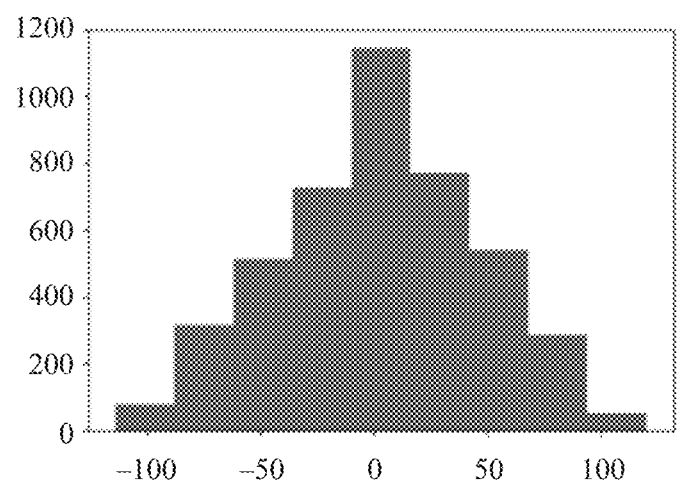
FIG. 6 is a schematic diagram of distribution of a training sample set in an image processing manner according to an embodiment of this application.

For another example, as shown in FIG. 4B, s being equal to 9 is used as an example for description. After classification, nine training sample sets shown in FIG. 4B may be obtained, p values gradually increase from left to right, and an angle of the face gradually shifts from left to right. It can be learned that a p value may reflect posture information of a face image. FIG. 6 is a schematic diagram of distribution of a training sample set in an image processing manner according to an embodiment of this application. As shown in FIG. 6, a horizontal axis in the figure is a p-axis, a vertical axis is an axis of quantities, and all training samples meet normal distribution. To be specific, a quantity of pictures of left or right side faces is less than a quantity of pictures of front faces, and in all the training samples, the quantity of pictures of front faces is relatively large. Therefore, in this embodiment of this application, the following step is used to select training samples to train the key point convolutional neural network model, so as to improve accuracy of positioning key points of face images having different posture information by using the trained target key point convolutional neural network model.

For example, nine training sample sets shown in FIG. 4B may be obtained after the foregoing steps are processed. Then, the following step 102 is used to select training samples to construct the training data.

Certainly, it may be understood that there may alternatively be another quantity of training sample sets. Examples are not provided for description herein one by one.

Step 102: Select a plurality of training samples from at least three of the s training sample sets as the training data.

The training data may include N training samples, and N is an integer greater than or equal to 3. In other words, N training samples are selected from the s training sample sets as the training data. The training data is used to train the key point convolutional neural network model. In a training process, N training samples are input in each iteration, a loss between an output value of the model and coordinates of a face key point of the training sample is calculated, and an update value of a model parameter is calculated through gradient backpropagation. A usable target key point convolutional neural network model is obtained through repeated iterations.

In some embodiments, in an implementation of selecting the plurality of training samples from at least three of the s training sample sets as the training data, the plurality of training samples are selected from at least three of the s training sample sets based on a classification result and according to a sample selection policy to construct the training data. The sample selection policy may be selecting based on a preset proportion. For example, in the training data, a proportion of face images having the first posture information is 30%, a proportion of face images having the second posture information is 40%, and a proportion of face images having the third posture information is 30%.

For example, the sample selection policy may be any one of the following three policies:

Policy 1 is an average sampling policy. The average sampling policy means that N/s training samples are selected from each training sample set Ti (where i ranges from 1 to s) to form a batch of training data. In other words, faces with each deflection angle in the training data occupy a balanced proportion, to ensure accuracy of a gradient direction. For example, proportions of the face images having the first posture information, the face images having the second posture information, and the face images having the third posture information in the training data are the same. In other words, proportions of face images deflecting leftward, forward, and rightward are the same.

Policy 2 is a left face enhancement sampling policy. The left face enhancement sampling policy means that, in the s training sample sets, more face images are selected from a training sample set that includes face images deflecting leftward, fewer face images are selected from a training sample set that includes face images deflecting rightward, and much fewer face images are selected from a training sample set that includes face images deflecting forward. For example, when N=32, selection may be performed based on a proportion of 66333344 according to the policy. To be specific, six images are selected from each of two training sample sets of left side faces, four images are selected from each of two training sample sets of right side faces, and three images are selected from each of four training sample sets of approximate front faces, to form the training data of the entire training iteration. In this way, a proportion of side faces in the training data can be increased, and a proportion of the left faces in the side faces is emphasized. This ensures the model to better position a left side face.

Policy 3 is a right face enhancement sampling policy. The right face enhancement sampling policy means that, in the s training sample sets, more face images are selected from a training sample set that includes face images deflecting rightward, fewer face images are selected from a training sample set that includes face images deflecting leftward, and much fewer face images are selected from a training sample set that includes face images deflecting forward. For example, when N=32, selection may be performed based on a proportion of 44333366. To be specific, four images are selected from each of two training sample sets of left side faces, six images are selected from each of two training sample sets of right side faces, and three images are selected from each of four training sample sets of approximate front faces, to form the training data of the entire training iteration. In this way, a proportion of side faces in the training data can be increased, and a proportion of the right faces in the side faces is emphasized. This ensures the model to better position a right side face.

It should be noted that the sample selection policy in this embodiment of this application may further include another policy, and this embodiment of this application is not limited to the foregoing three policies.

In this embodiment of this application, the training samples are classified based on the posture information, to obtain the s training sample sets. The training samples are selected from the s training sample sets, to construct the training data. In this implementation, selection of the training data can improve a convergence speed and a training speed of the model. The training data is selected based on the posture information, so that the training data can balance impact of faces at various angles on model optimization, so as to improve face key point positioning accuracy. For example, positioning accuracy of a key point of a face image with a large deflection angle may be improved.

(2) Model Training

Figure 7A:
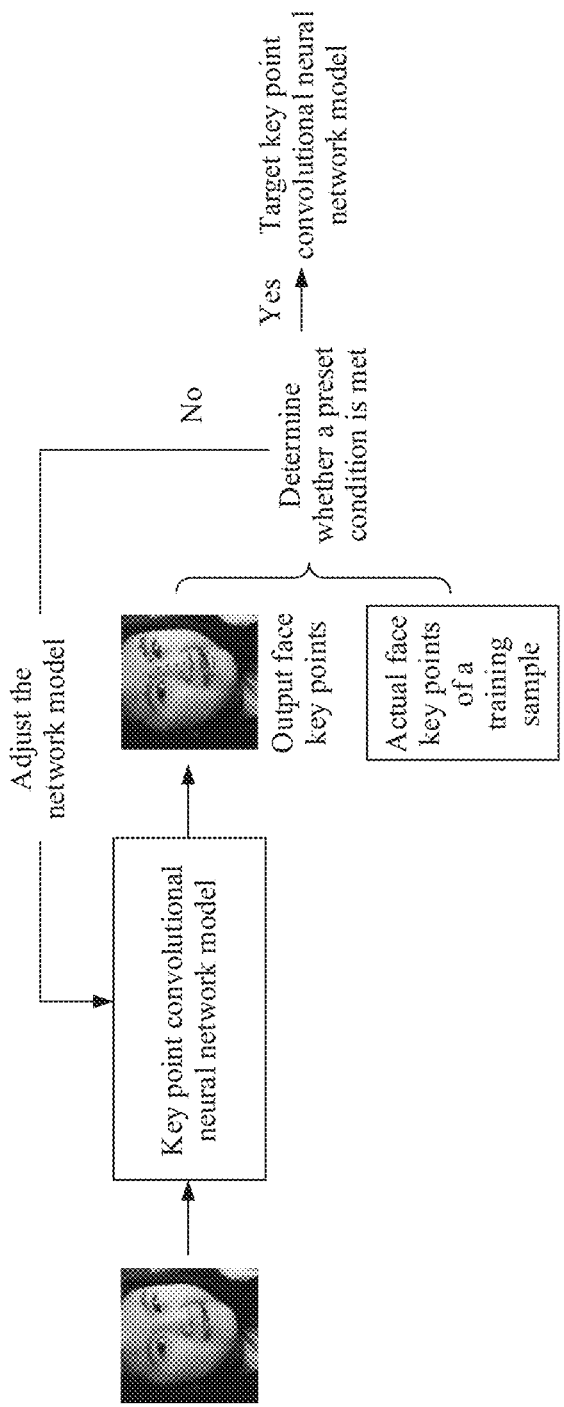
FIG. 7A is a schematic diagram of training a key point convolutional neural network model according to an embodiment of this application.

In an implementation, FIG. 7A is a schematic diagram of training a key point convolutional neural network model according to an embodiment of this application. As shown in FIG. 7A, the training data in the foregoing embodiment is input into the key point convolutional neural network model, and the key point convolutional neural network model learns the training data to adjust the network model.

The key point convolutional neural network model may process a face image of a training sample, output coordinates of a face key point, and perform optimization adjustment on the network model based on the coordinates that is of the face key point and that is output by the model and coordinates of an actual face key point in the training sample.

Figure 7B:
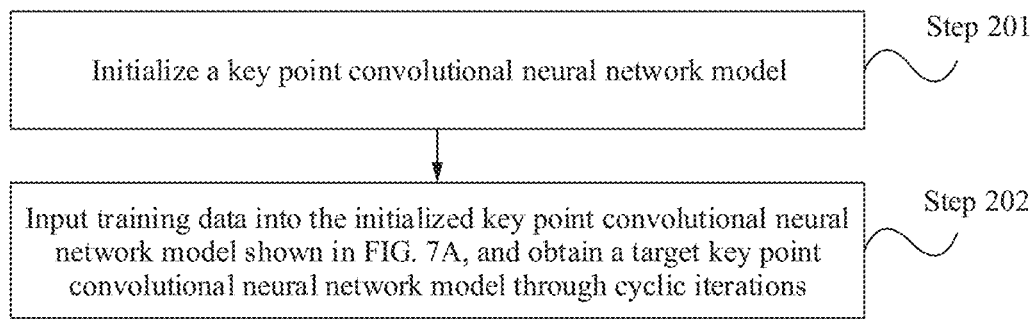
FIG. 7B is a flowchart of a training method for a key point convolutional neural network model according to an embodiment of this application.

For example, the key point convolutional neural network model in this embodiment of this application may be a residual network (ResNet), for example, a ResNet 50. FIG. 7C-1 to FIG. 7C-3 and FIG. 7D are schematic diagrams of a network structure of the ResNet 50 according to an embodiment of this application. As shown in FIG. 7C-1 to FIG. 7C-3 and FIG. 7D, the ResNet 50 includes a plurality of small network blocks (which may also be referred to as layers), and a composition of each small network block is shown in FIG. 7D. An identity mapping connection is added to make the network model more sensitive to a subtle change. For example, if 5 is mapped to 5.1, before a residual is introduced, a mapping needs to be learned to enable F'(5)=5.1. After the residual is introduced, H(5)=5.1, H(5)=F(5)+5, and F(5)=0.1. F' and F herein each represent a network parameter mapping. A mapping with an introduced residual is more sensitive to a change in an output. For example, when an output of changes from 5.1 to 5.2, an output of the mapping F' is incremented by 1/51=2%, whereas when an output of a residual structure changes from 5.1 to 5.2, the mapping F is incremented by 100% from 0.1 to 0.2. It is clear that a change in the output of the latter has greater impact on weight adjustment, so that an effect is better. An idea of the residual is to remove a same body part, so as to highlight small changes. The idea of the residual is introduced, so that a quantity of network layers can be increased and an expression ability of the network model can be enhanced.

Figures 1, 7C:
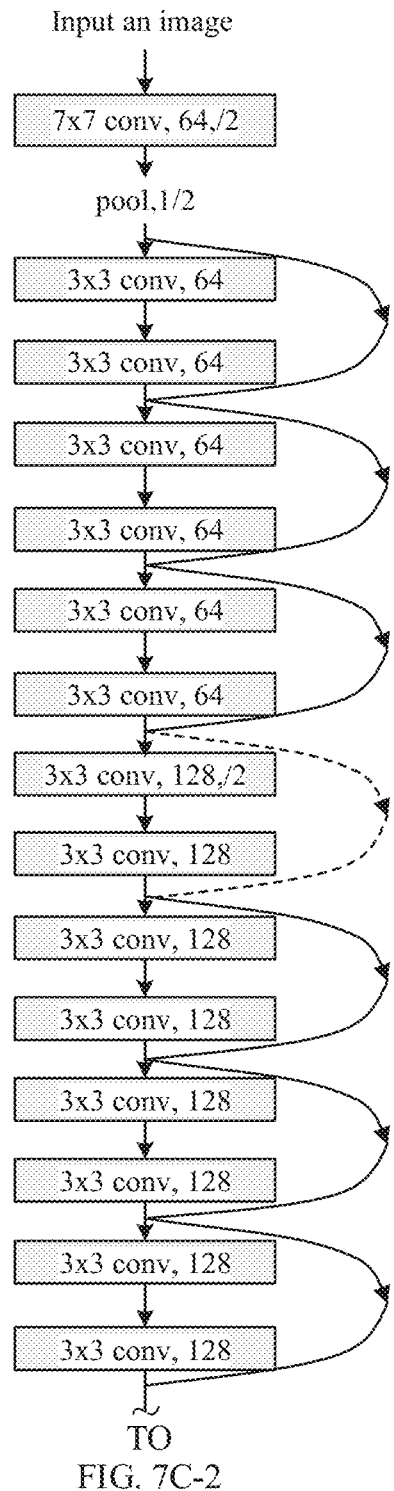
Figures 2, 7C:
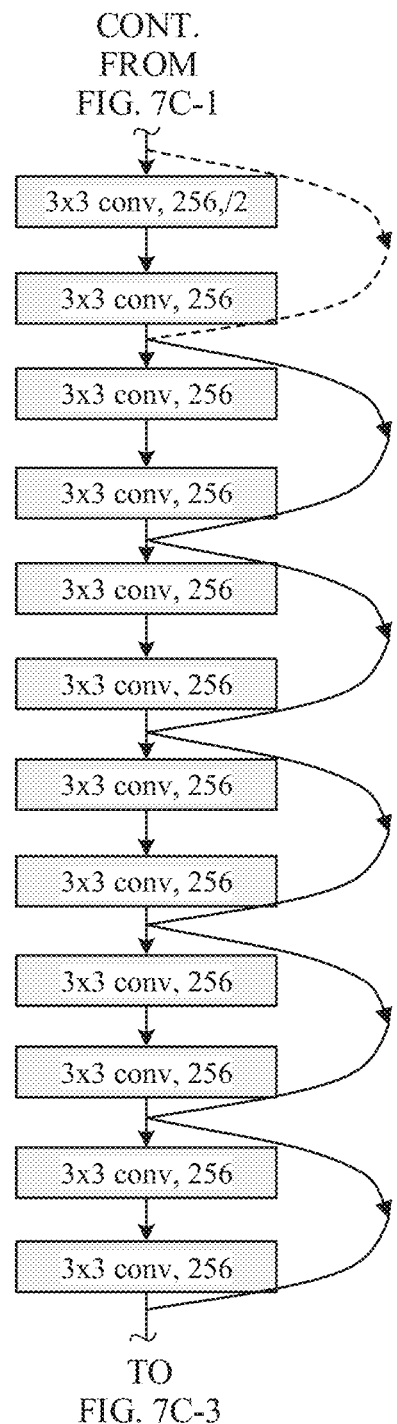
Figures 3, 7C:
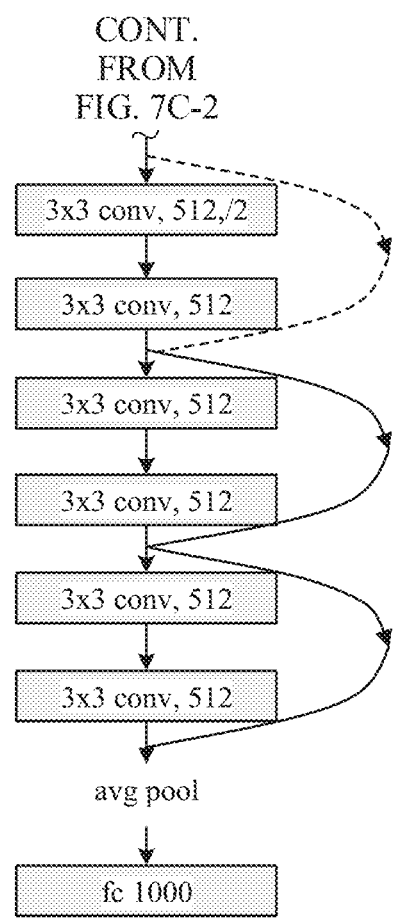
Figure 7D:
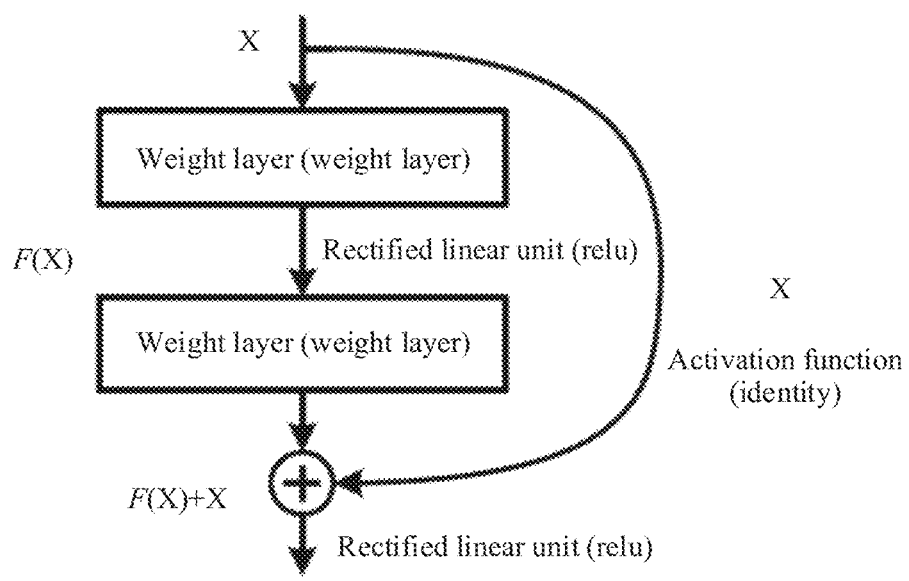

As shown in FIG. 7C-1 to FIG. 7C-3, the ResNet 50 includes 49 convolutional layers, 2 pooling layers, and 1 fully-connected layer. Each convolution layer is followed by a batch normalization layer and a rectified linear unit to constrain an output of the convolution layer, so that the network model can be designed deeper and more expressive. The convolutional layer is responsible for extracting a high-level feature representation of an image and fusing information of different channels to extract an abstract feature representation of the input image. The pooling layer is configured to compress a size of an output matrix and enlarge a receptive field of the image, to ensure high compactness of a feature. The fully-connected layer is configured to perform linear integration on a feature map, and adapt to each predefined output dimension related to a to-be-solved problem. For example, in this embodiment of this application, output dimensions are L×2 (for example, 68×2) dimensions. L is a quantity of face key points of a face image. Every two values represent a coordinate value of a key point, for example, an x coordinate and a y coordinate of the key point.

FIG. 7B is a flowchart of a training method for the key point convolutional neural network model according to an embodiment of this application. As shown in FIG. 7B, the training method for the key point convolutional neural network model in this application may include the following steps.

Step 201: Initialize the key point convolutional neural network model.

The key point convolutional neural network model shown in FIG. 7A is initialized. In other words, a parameter of the key point convolutional neural network model is assigned to an initialization parameter.

Step 202: Input the training data into the initialized key point convolutional neural network model shown in FIG. 7A, and obtain a target key point convolutional neural network model through cyclic iterations.

A specific implementation may be as follows: Refer to FIG. 7A. After an input face image is processed, coordinates of a face key point are output. In this step, the output coordinates of the face key point are compared with coordinates of a face key point of a training sample. For example, a corresponding operation is performed to obtain a loss cost result. The initialized key point convolutional neural network model is adjusted based on the loss cost result. For example, a preset condition that the loss cost result meets may be set. If the preset condition is not met, the parameter of the key point convolutional neural network model may be adjusted. The face image of the training data is processed by using an adjusted key point convolutional neural network model, to further obtain a new loss cost result through calculation. Whether the new loss cost result meets the preset condition is determined. Iterations are repeated until a new loss cost result meets the preset condition. In this case, the target key point convolutional neural network model is obtained. In a model using phase, the target key point convolutional neural network model is used.

In this embodiment, the key point convolutional neural network model is initialized, and the training data is input into the initialized key point convolutional neural network model shown in FIG. 7A. The target key point convolutional neural network model is obtained through cyclic iterations. The model is trained by using training samples having different posture information. Therefore, impact of face images having different posture information on optimization of the key point convolutional neural network model can be balanced, and face key point positioning accuracy of the target convolutional neural network model obtained through training can be improved. In addition, because the training data is selected, a gradient descent direction in a model training process may be more accurate.

In another implementation, different from the embodiment shown in FIG. 7A, a key point convolutional neural network model trained in this embodiment of this application includes a first key point convolutional neural network model and a second key point convolutional neural network model.

Figure 8:
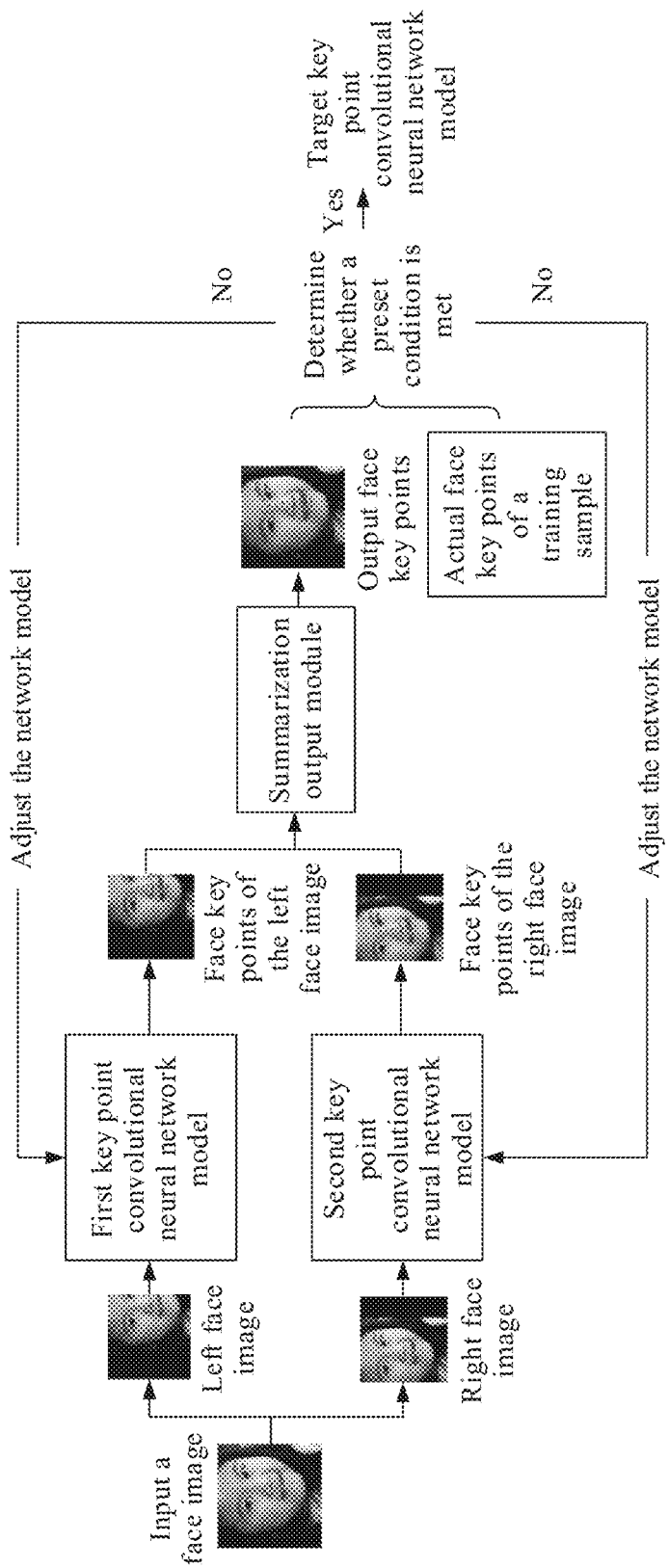
FIG. 8 is a schematic diagram of training a key point convolutional neural network model according to an embodiment of this application.

FIG. 8 is a schematic diagram of training the key point convolutional neural network model according to an embodiment of this application. As shown in FIG. 8, the training data in the foregoing embodiment is input into the first key point convolutional neural network model and the second key point convolutional neural network model. The first key point convolutional neural network model is used to learn a left face image, and the second key point convolutional neural network model is used to learn a right face image.

The first key point convolutional neural network model and the second key point convolutional neural network model in this embodiment of this application are network structure models based on half-face regression. An image segmentation module is separately connected to the first key point convolutional neural network model and the second key point convolutional neural network model. The first key point convolutional neural network model and the second key point convolutional neural network model are separately connected to a summarization output module.

Specifically, a face image of the training data is input into the image segmentation module, and the image segmentation module is configured to segment the face image, to output a left face image and a right face image. The left face image is input into the first key point convolutional neural network model, and the right face image is input into the second key point convolutional neural network model. Coordinates of a face key point of the left face image may be obtained through a first branch, and coordinates of a face key point of the right face image may be obtained through a second branch. Then, the summarization output module summarizes and outputs, by using a structured feature of a face, coordinates of a face key point of the face image. The output coordinates of the face key point are compared with coordinates of a face key point of a training sample, to optimize the first key point convolutional neural network model and the second key point convolutional neural network model, so as to obtain target key point convolutional neural network models: a first target key point convolutional neural network model and a second target key point convolutional neural network model.

For example, either of the first key point convolutional neural network model and the second key point convolutional neural network model in this embodiment of this application may be a residual network (ResNet), for example, the ResNet 50. For specific descriptions of the first key point convolutional neural network model and the second key point convolutional neural network model, refer to descriptions in FIG. 7C-1 to FIG. 7C-3 and FIG. 7D. Details are not described herein again.

For a process of the training method for the key point convolutional neural network model in this embodiment, refer to FIG. 7B. To be specific, the key point convolutional neural network model is first initialized, and then the network model is optimized through iterations. A difference lies in that the key point convolutional neural network model in this embodiment of this application includes the first key point convolutional neural network model and the second key point convolutional neural network model. In other words, two network models are initialized. The training data is input into the initialized first key point convolutional neural network model and the initialized second key point convolutional neural network model shown in FIG. 8. The first target key point convolutional neural network model and the second target key point convolutional neural network model are obtained through cyclic iterations.

In this embodiment, the first key point convolutional neural network model and the second key point convolutional neural network model are initialized. The training data is input into the initialized first key point convolutional neural network model and the initialized second key point neural network model shown in FIG. 8. The first target key point convolutional neural network model and the second target key point convolutional neural network model are obtained through cyclic iterations. The model is trained by using training samples having different posture information. Therefore, impact of face images having different posture information on optimization of the key point convolutional neural network model can be balanced, and face key point positioning accuracy of the target convolutional neural network model obtained through training can be improved. In addition, because the training data is selected, a gradient descent direction in a model training process may be more accurate.

In addition, the first target key point convolutional neural network model and the second target key point convolutional neural network model are half-face regression models. The network model is relatively simple, and optimization is more accurate. In addition, a structured feature of a face may be used to improve face key point positioning accuracy of the model.

In still another implementation, different from the embodiment shown in FIG. 8, a key point convolutional neural network model trained in this embodiment of this application includes a first key point convolutional neural network model, a second key point convolutional neural network model, a third key point convolutional neural network model, and a fourth key point convolutional neural network model.

Figure 9A:
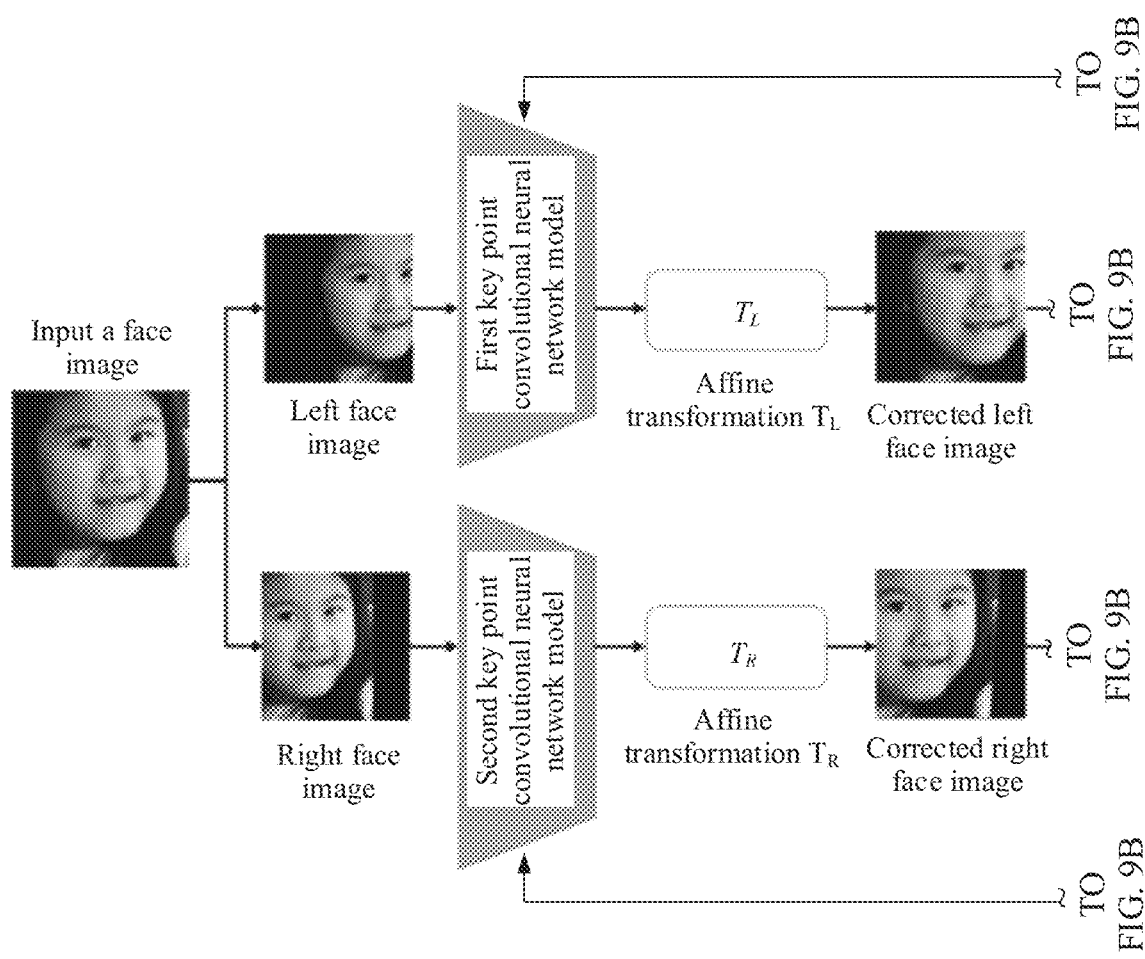
FIG. 9A and FIG. 9B are a schematic diagram of training a key point convolutional neural network model according to an embodiment of this application.
Figure 9B:
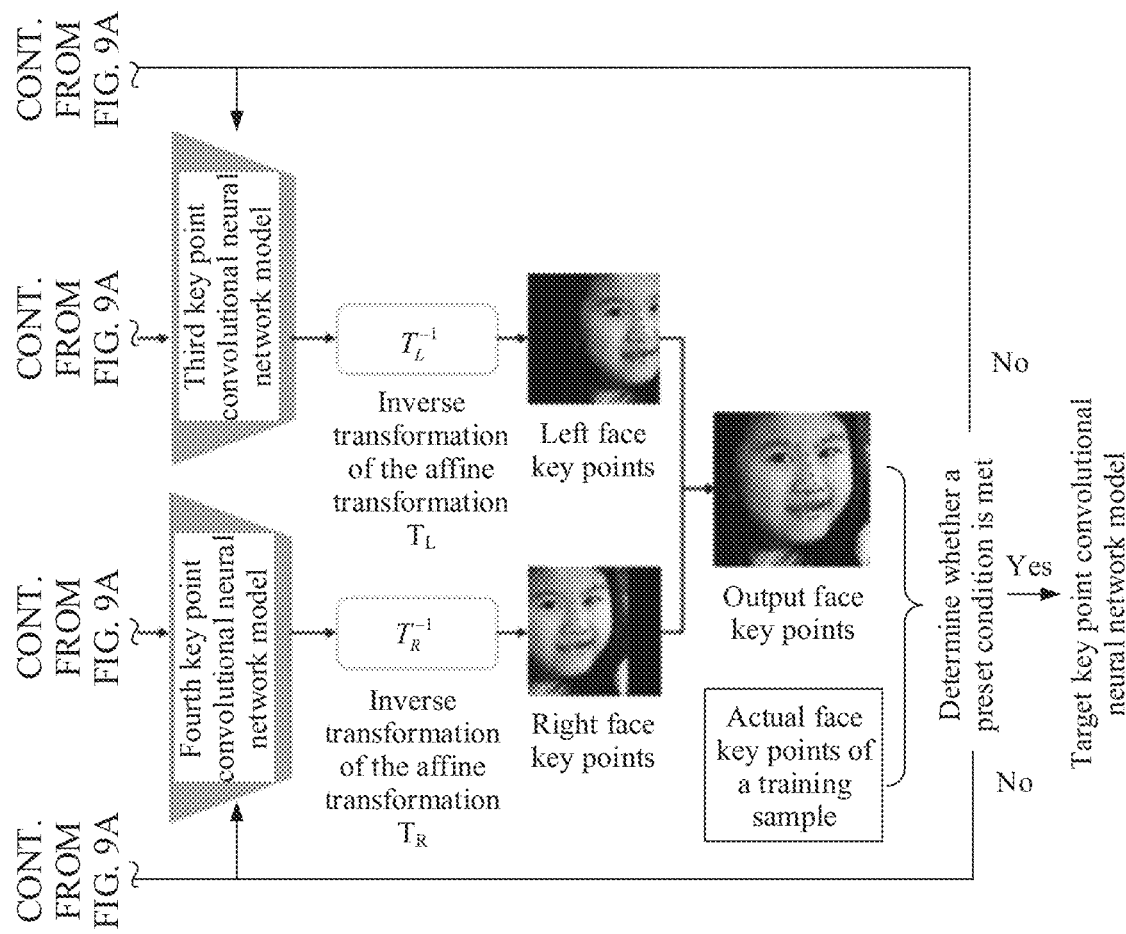

FIG. 9A and FIG. 9B are a schematic diagram of training the key point convolutional neural network model according to an embodiment of this application. As shown in FIG. 9A and FIG. 9B, the training data in the foregoing embodiment is input into the first key point convolutional neural network model, the second key point convolutional neural network model, the third key point convolutional neural network model, and the fourth key point convolutional neural network model. The first key point convolutional neural network model and the third key point convolutional neural network model are used to learn a left face image, and the second key point convolutional neural network model and the fourth key point convolutional neural network model are used to learn a right face image.

The first key point convolutional neural network model, the second key point convolutional neural network model, the third key point convolutional neural network model, and the fourth key point convolutional neural network model in this embodiment of this application are two-phase network structure models based on half-face regression. As shown in FIG. 9A and FIG. 9B, an image segmentation module is separately connected to the first key point convolutional neural network model and the second key point convolutional neural network model. The first key point convolutional neural network model and the third key point convolutional neural network model are cascaded by using a first affine transformation module, and then are connected to an inverse transformation module of the first affine transformation module. The second key point convolutional neural network model and the fourth key point convolutional neural network model are cascaded by using a second affine transformation module, and then are connected to an inverse transformation module of the second affine transformation module. The inverse transformation module of the first affine transformation module and the inverse transformation module of the second affine transformation module are separately connected to a summarization output module.

Specifically, a face image of the training data is input into the image segmentation module, and the image segmentation module is configured to segment the face image, to output a left face image and a right face image. The left face image is input into the first key point convolutional neural network model, and the right face image is input into the second key point convolutional neural network model. Coordinates of a face key point of the left face image may be obtained through a first branch, and coordinates of a face key point of the right face image may be obtained through a second branch. Then, the coordinates are summarized by using a structured feature of a face to output coordinates of a face key point of the face image. The output coordinates of the face key point are compared with coordinates of a face key point of a training sample, to optimize the key point convolutional neural network models, so as to obtain target key point convolutional neural network models: a first target key point convolutional neural network model, a second target key point convolutional neural network model, a third target key point convolutional neural network model, and a fourth target key point convolutional neural network model.

For example, any one of the first key point convolutional neural network model, the second key point convolutional neural network model, the third key point convolutional neural network model, and the fourth key point convolutional neural network model in this embodiment of this application may be a residual network (ResNet), for example, the ResNet 50. For specific descriptions of the first key point convolutional neural network model, the second key point convolutional neural network model, the third key point convolutional neural network model, and the fourth key point convolutional neural network model, refer to descriptions in FIG. 7C-1 to FIG. 7C-3 and FIG. 7D. Details are not described herein again.

For a process of the training method for the key point convolutional neural network model in this embodiment, refer to FIG. 7B. To be specific, the key point convolutional neural network model is first initialized, and then the network model is optimized through iterations. A difference lies in that the key point convolutional neural network model in this embodiment of this application includes the first key point convolutional neural network model, the second key point convolutional neural network model, the third key point convolutional neural network model, and the fourth key point convolutional neural network model. In other words, four network models are initialized. The training data is input into the initialized first key point convolutional neural network model and the initialized second key point neural network model shown in FIG. 9A and FIG. 9B. The first target key point convolutional neural network model, the second target key point convolutional neural network model, the third target key point convolutional neural network model, and the fourth target key point convolutional neural network model are obtained through cyclic iterations.

In this embodiment, the first key point convolutional neural network model, the second key point convolutional neural network model, the third key point convolutional neural network model, and the fourth key point convolutional neural network model are initialized. The training data is input into the initialized first key point convolutional neural network model, the initialized second key point convolutional neural network model, the initialized third key point convolutional neural network model, and the initialized fourth key point convolutional neural network model shown in FIG. 9A and FIG. 9B. The first target key point convolutional neural network model, the second target key point convolutional neural network model, the third key point convolutional neural network model, and the fourth key point convolutional neural network model are obtained through cyclic iterations. The model is trained by using training samples having different posture information. Therefore, impact of face images having different posture information on optimization of the key point convolutional neural network model can be balanced, and face key point positioning accuracy of the target convolutional neural network model obtained through training can be improved. In addition, because the training data is selected, a gradient descent direction in a model training process may be more accurate.

In addition, the first target key point convolutional neural network model, the second target key point convolutional neural network model, the third key point convolutional neural network model, and the fourth key point convolutional neural network model are two-phase half-face regression models. The network model is relatively simple, and optimization is more accurate. In addition, a structured feature of a face may be used to improve face key point positioning accuracy of the model.

The foregoing embodiments describe training data construction and model training by using the training data. The following embodiments describe face key point positioning performed by using a trained model.

(3) Model Using

Figure 10:
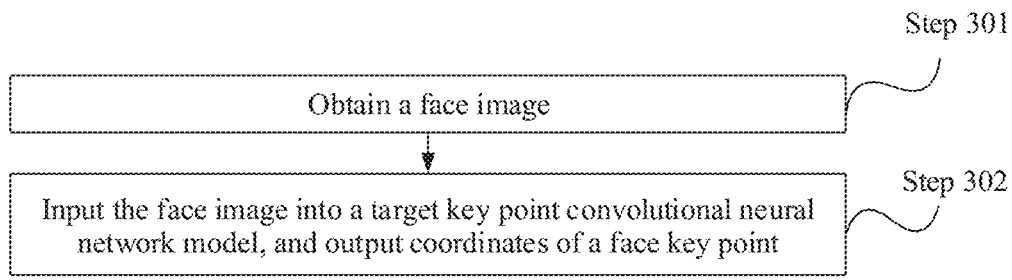
FIG. 10 is a flowchart of an image processing method according to an embodiment of this application.

FIG. 10 is a flowchart of an image processing method according to an embodiment of this application. As shown in FIG. 10, this embodiment may be executed by the foregoing model application device, application server, or an internal chip thereof. The image processing method in this application may include the following steps.

Step 301: Obtain a face image.

The face image is a to-be-processed image or an image obtained by performing a capturing operation on a to-be-processed image. The to-be-processed image may be an image collected by any terminal having a photographing function or a shooting function, for example, an image collected by a smartphone.

Step 302: Input the face image into a target key point convolutional neural network model, and output coordinates of a face key point.

The target key point convolutional neural network model is obtained after a key point convolutional neural network model is trained by using face images having different posture information, and the posture information is used to reflect a deflection angle of a face.

The target key point convolutional neural network model may be a target key point convolutional neural network model obtained through training by using the training process shown in FIG. 7A.

In this embodiment, the face image is obtained, the face image is input into the target key point convolutional neural network model, and the coordinates of the face key point are output. In this embodiment, the target key point convolutional neural network model is used to process the face image. The target key point convolutional neural network model is trained by using training samples having different posture information. Therefore, impact of the face images having different posture information on optimization of the key point convolutional neural network model can be balanced, and face key point positioning accuracy can be effectively improved.

Figure 11A:
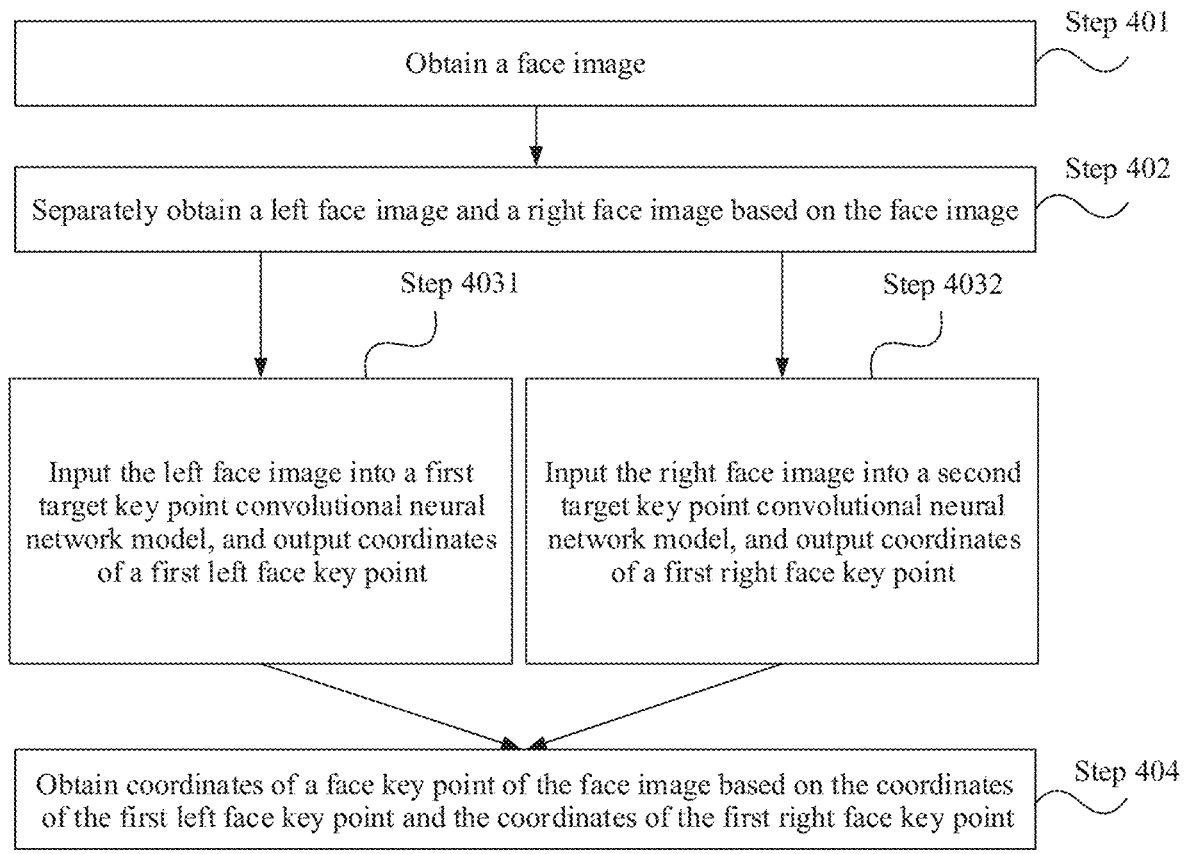
FIG. 11A is a flowchart of another image processing method according to an embodiment of this application.
Figure 11B:
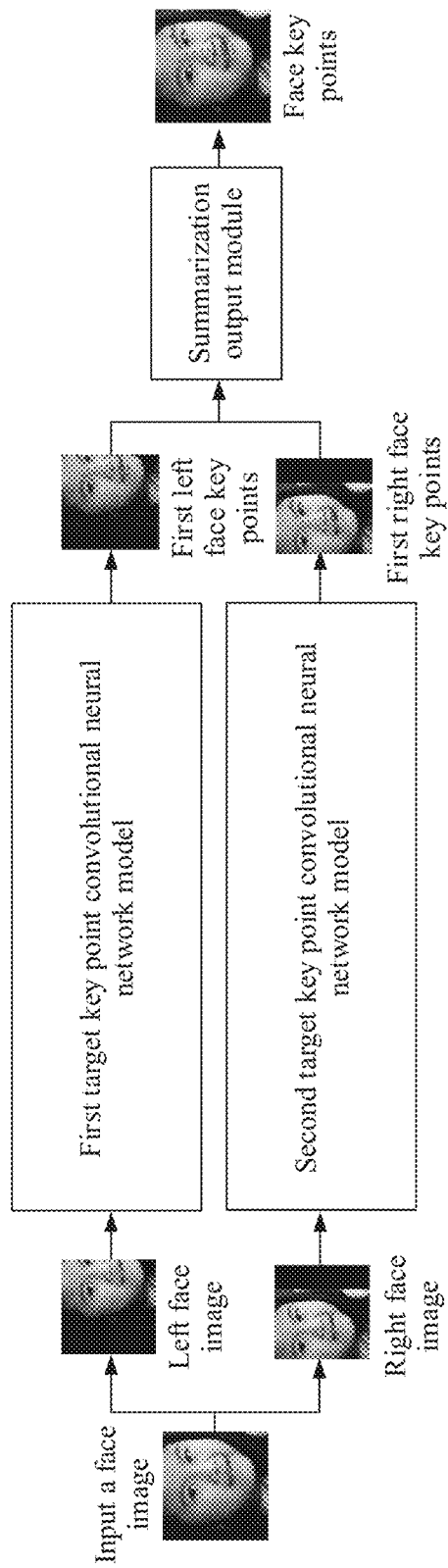
FIG. 11B is a schematic diagram of another image processing method according to an embodiment of this application.

FIG. 11A is a flowchart of another image processing method according to an embodiment of this application. FIG. 11B is a schematic diagram of the another image processing method according to an embodiment of this application. As shown in FIG. 11A, a difference between the embodiment shown in FIG. 10 and this embodiment lies in that segmentation processing may further be performed on a face image, and processing is performed by using the target key point convolutional neural network model obtained in the training process shown in FIG. 8. The image processing method in this application may include the following steps.

Step 401: Obtain a face image.

For a specific description of step 401, refer to the description of step 301 in the embodiment shown in FIG. 10. Details are not described herein again.

Step 402: Separately obtain a left face image and a right face image based on the face image.

In an implementation, segmentation processing and filling processing are performed on the face image, to separately obtain the left face image and the right face image. Sizes of the left face image and the right face image are the same as a size of the face image.

In an example segmentation manner, the face image is divided into four equal parts along a vertical direction. Three left parts are selected, and a black background image is added to a leftmost part of the left three parts A size of the black background image is the same as a size of the equal part. The left face image is obtained, and the size of the left face image is the same as the size of the face image. Three right parts of the four equal parts are selected, and a black background image is added to a rightmost part of the right three parts. A size of the black background image is the same as the size of the equal part. The right face image is obtained, and the size of the right face image is the same as the size of the face image.

The segmentation manner can ensure that in the left face image and the right face image, left-half and right-half face areas are respectively located in the centers of the images.

It should be noted that four equal parts are used as an example for description in the foregoing segmentation manner. Alternatively, a quantity of equal parts may be six, seven, eight, or another integer value. Examples are not provided for description one by one in this embodiment of this application.

Refer to FIG. 11B. After the processing in step 402 is performed, the obtained left face image and right face image are respectively input into a first target key point convolutional neural network model and a second target key point convolutional neural network model.

Step 4031: Input the left face image into the first target key point convolutional neural network model, and output coordinates of a first left face key point.

The first target key point convolutional neural network model may be obtained by using the training process shown in FIG. 8. The first target key point convolutional neural network model is used to process the left face image and output the coordinates of the first left face key point shown in FIG. 11B.

Step 4032: Input the right face image into the second target key point convolutional neural network model, and output coordinates of a first right face key point.

The second target key point convolutional neural network model may be obtained by using the training process shown in FIG. 8. The second target key point convolutional neural network model is used to process the right face image and output the coordinates of the second left face key point shown in FIG. 11B.

Step 404: Obtain coordinates of a face key point of the face image based on the coordinates of the first left face key point and the coordinates of the first right face key point.

The coordinates of the first left face key point and the coordinates of the first right face key point are summarized. For example, a quantity of first left face key points is 39, and a quantity of first right face key points is 39. Coordinates of the first left face key points and coordinates of the first right face key points are summarized based on structured information of a face. 10 points in a middle area are duplicate, and coordinates of the face key points in the middle area may be obtained in an average value calculation manner in the middle area. Finally, coordinates of 68 face key points are obtained.

In this embodiment, the face image is obtained; the left face image and the right face image are separately obtained based on the face image; the left face image is input into the first target key point convolutional neural network model, and the coordinates of the first left face key point are output; the right face image is input into the second target key point convolutional neural network model, and the coordinates of the first right face key point are output; and the coordinates of the face key point of the face image are obtained based on the coordinates of the first left face key point and the coordinates of the first right face key point. In this embodiment, the first target key point convolutional neural network model is used to process the left face image, and the second target key point convolutional neural network model is used to process the right face image. The first target key point convolutional neural network model and the second target key point convolutional neural network model are trained by using training samples having different posture information. Therefore, impact of face images having different posture information on optimization of the key point convolutional neural network model can be balanced, and face key point positioning accuracy can be effectively improved.

In addition, the first target key point convolutional neural network model and the second target key point convolutional neural network model are half-face regression models. The network model is relatively simple, and half-face positioning accuracy is high. In addition, a structured feature of the face may be used to further improve face key point positioning accuracy of the model.

Figure 12A:
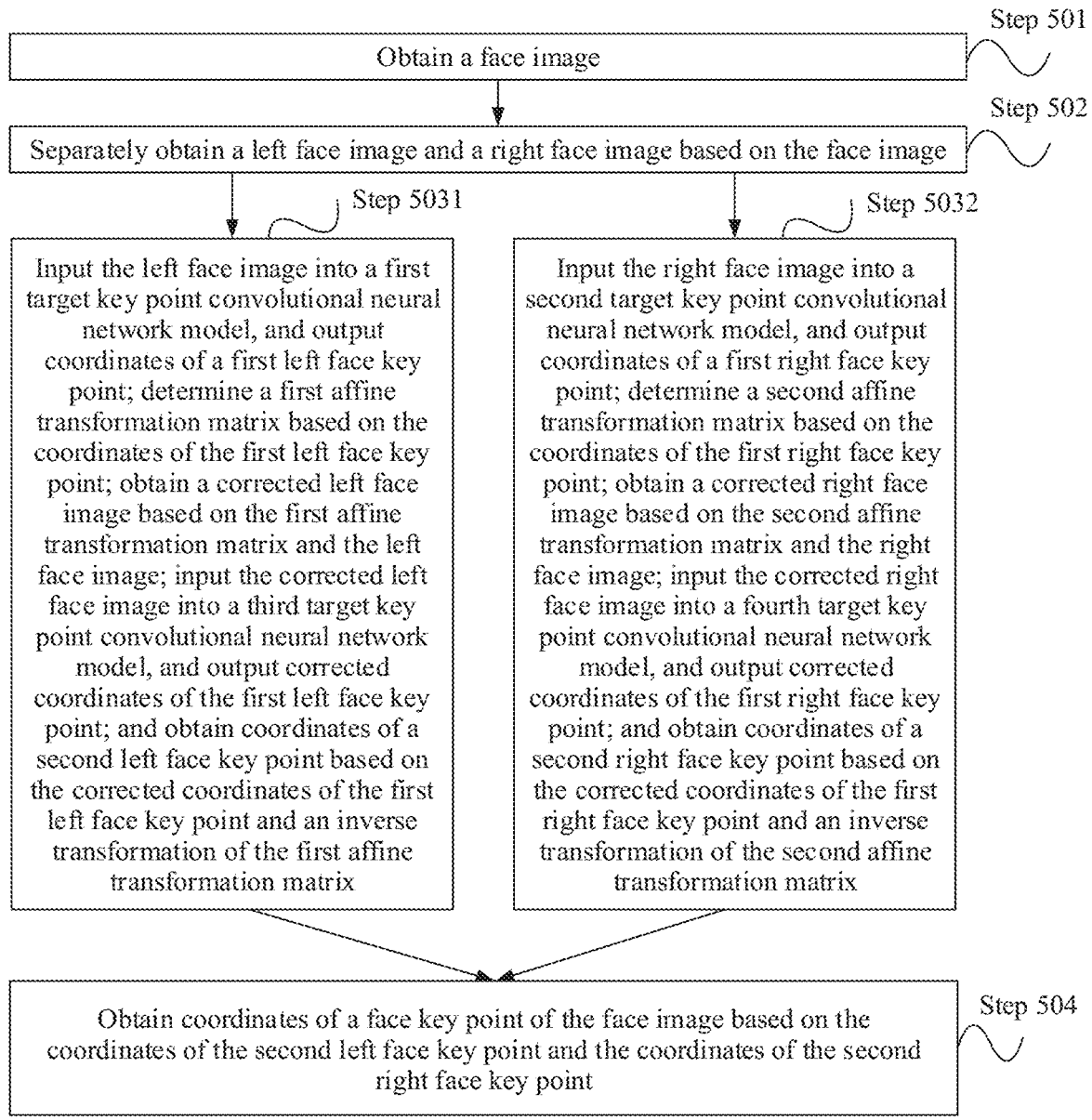
FIG. 12A is a flowchart of another image processing method according to an embodiment of this application.
Figures 1, 12B:
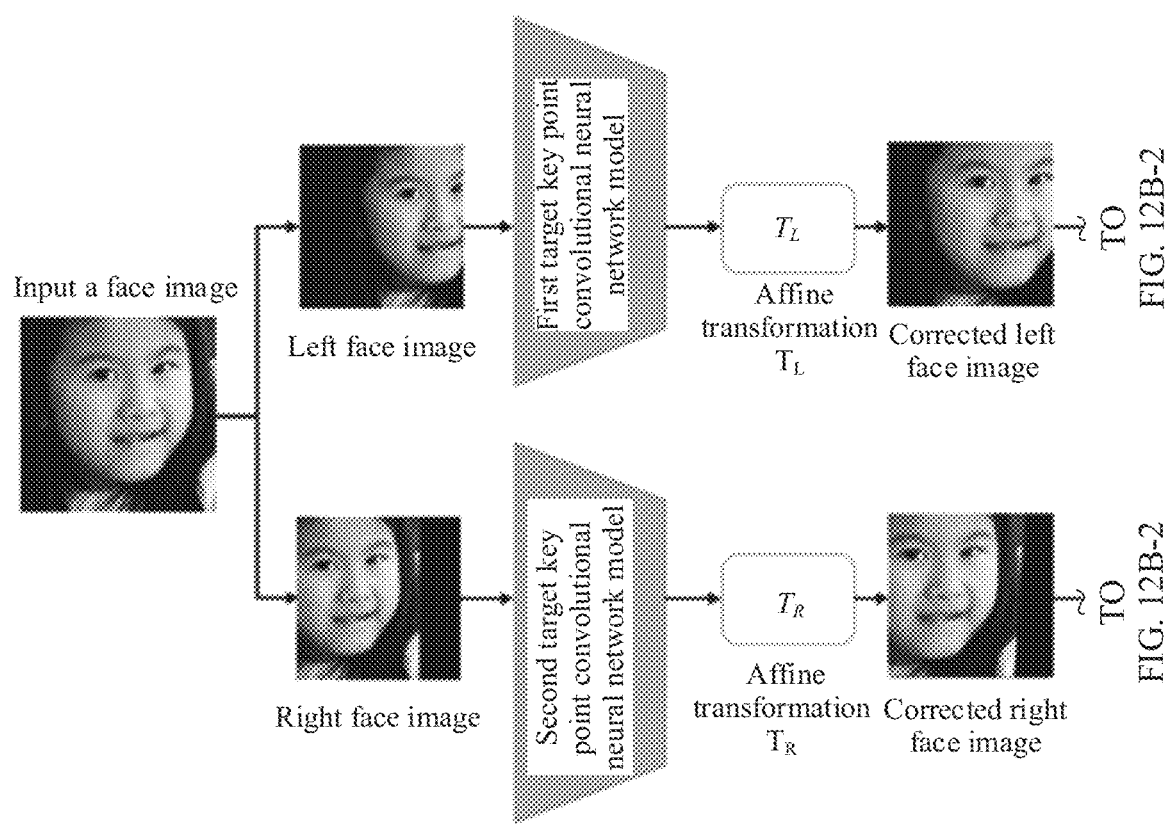
Figures 2, 12B:
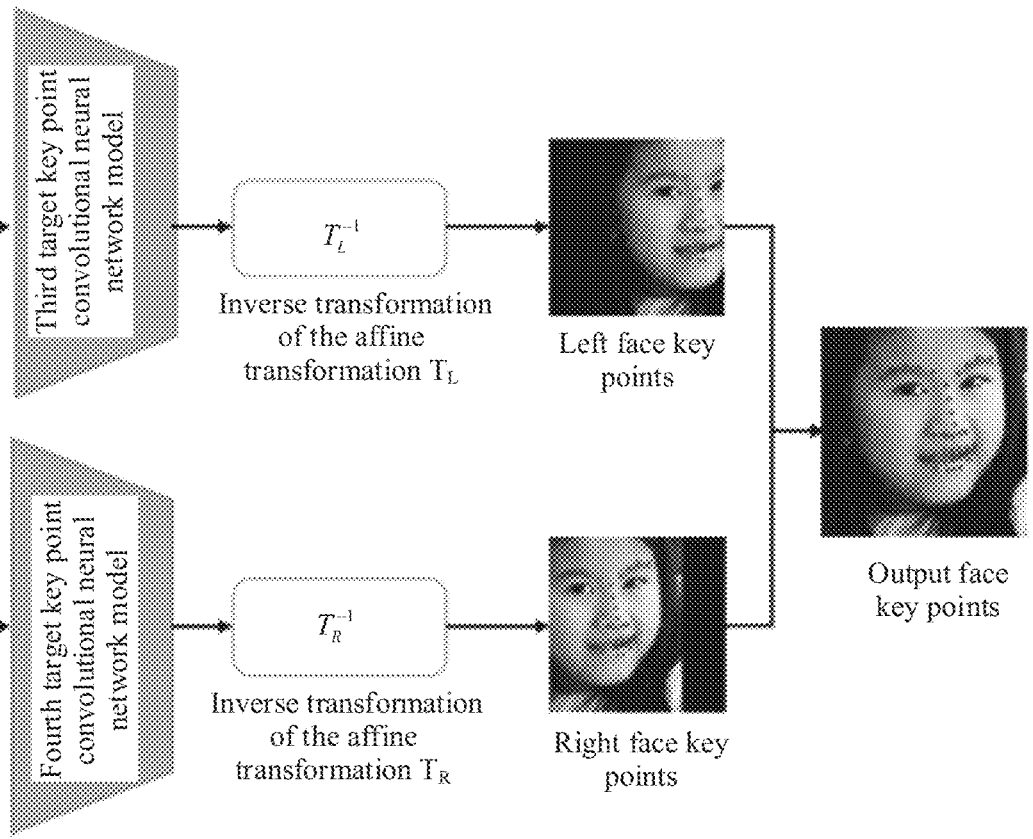

FIG. 12A is a flowchart of another image processing method according to an embodiment of this application. FIG. 12B-1 and FIG. 12B-2 are a schematic diagram of the another image processing method according to an embodiment of this application. As shown in FIG. 12A, a difference between the embodiment shown in FIG. 11A and this embodiment lies in that face key point positioning accuracy may further be improved by using a third target key point convolutional neural network model and a fourth target key point convolutional neural network model. The image processing method in this application may include the following steps.

Step 501: Obtain a face image.

For a specific description of step 501, refer to the description of step 301 in the embodiment shown in FIG. 10. Details are not described herein again.

Step 502: Separately obtain a left face image and a right face image based on the face image, where sizes of the left face image and the right face image are the same as a size of the face image.

For a specific description of step 502, refer to the description of step 402 in the embodiment shown in FIG. 10. Details are not described herein again.

Step 5031: Input the left face image into a first target key point convolutional neural network model, and output coordinates of a first left face key point; determine a first affine transformation matrix based on the coordinates of the first left face key point; obtain a corrected left face image based on the first affine transformation matrix and the left face image; input the corrected left face image into the third target key point convolutional neural network model, and output corrected coordinates of the first left face key point; and obtain coordinates of a second left face key point based on the corrected coordinates of the first left face key point and an inverse transformation of the first affine transformation matrix.

The first target key point convolutional neural network model is used to process the left face image to output the coordinates of the first left face key point of the left face image. The first affine transformation matrix, for example, a 3×3 matrix, is determined based on the coordinates of the first left face key point and coordinates of a key point of an average image. The first affine transformation matrix minimizes a two-norm difference between transposition of the first affine transformation matrix multiplied by the coordinates of the first left face key point and the coordinates of the key point of the average image. The first affine transformation matrix $T_L$ may be solved by using the classical least square method. The left face image is aligned to the average image by using the first affine transformation matrix, to obtain the corrected left face image. The corrected left face image is shown in FIG. 12B-1 and FIG. 12B-2. To further improve face key point positioning accuracy, the corrected left face image is input into the third target key point convolutional neural network model, and the corrected coordinates of the first left face key point are output. The coordinates of the second left face key point are obtained based on the inverse transformation of the first affine transformation matrix. In this way, a key point output of the half face is obtained.

Step 5032: Input the right face image into a second target key point convolutional neural network model, and output coordinates of a first right face key point; determine a second affine transformation matrix based on the coordinates of the first right face key point; obtain a corrected right face image based on the second affine transformation matrix and the right face image; input the corrected right face image into the fourth target key point convolutional neural network model, and output corrected coordinates of the first right face key point; and obtain coordinates of a second right face key point based on the corrected coordinates of the first right face key point and an inverse transformation of the second affine transformation matrix.

The second target key point convolutional neural network model is used to process the right face image to output the coordinates of the first right face key point of the right face image. The second affine transformation matrix, for example, a 3×3 matrix, is determined based on the coordinates of the first right face key point and the coordinates of the key point of the average image. The second affine transformation matrix minimizes a two-norm difference between transposition of the second affine transformation matrix multiplied by the coordinates of the first right face key point and the coordinates of the key point of the average image. The first affine transformation matrix $T_R$ may be solved by using the classical least square method. The right face image is aligned to the average image by using the second affine transformation matrix, to obtain the corrected right face image. The corrected right face image is shown in FIG. 12B-1 and FIG. 12B-2. To further improve face key point positioning accuracy, the corrected right face image is input into the fourth target key point convolutional neural network model, and the corrected coordinates of the first right face key point are output. The coordinates of the second right face key point are obtained based on the inverse transformation of the second affine transformation matrix. In this way, a key point output of the half face is obtained.

Step 504: Obtain coordinates of a face key point of the face image based on the coordinates of the second left face key point and the coordinates of the second right face key point.

The coordinates of the second left face key point and the coordinates of the second right face key point are summarized. Compared with the coordinates of the first left face key point and the coordinates of the first right face key point in the embodiment shown in FIG. 11, the coordinates of the second left face key point and the coordinates of the second right face key point have higher accuracy.

In this embodiment, the left face image is processed by using the first target key point convolutional neural network model, the left face image is corrected based on an output result of the first target key point convolutional neural network model, and the corrected left face image is processed by using the third target key point convolutional neural network model. This may improve positioning accuracy of a left face key point. The right face image is processed by using the second target key point convolutional neural network model, the right face image is corrected based on an output result of the second target key point convolutional neural network model, and the corrected right face image is processed by using the fourth target key point convolutional neural network model. This may improve positioning accuracy of a right face key point. The first target key point convolutional neural network model, the second target key point convolutional neural network model, the third target key point convolutional neural network model, and the fourth target key point convolutional neural network model are trained by using training samples having different posture information. Therefore, impact of face images having different posture information on optimization of the key point convolutional neural network model can be balanced, and face key point positioning accuracy can be effectively improved.

In addition, the first target key point convolutional neural network model, the second target key point convolutional neural network model, the third target key point convolutional neural network model, and the fourth target key point convolutional neural network model are two-phase half-face regression models, and half-face positioning accuracy is high. In addition, a structured feature of a face may be used to further improve face key point positioning accuracy of the model.

(4) Application Scenarios

The image processing methods in the foregoing embodiments of this application may be used to position a face key point. The image processing methods may be applied to different scenarios such as facial recognition, face posture estimation, face image quality evaluation, video interaction, and live-body verification. The following uses some specific application scenarios as examples for description.

Scenario 1: A Fatigue Driving Reminder System

Figure 13:
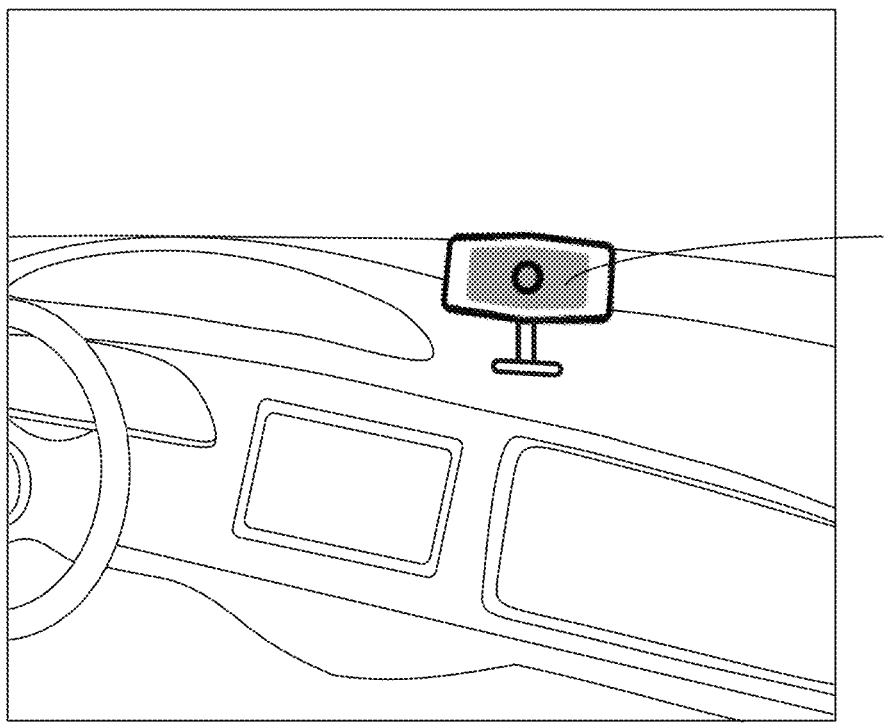
FIG. 13 is a schematic diagram of an application scenario of an image processing method according to an embodiment of this application.

FIG. 13 is a schematic diagram of an application scenario of the image processing method according to an embodiment of this application. As shown in FIG. 13, any image processing method in the foregoing embodiments of this application may be applied to the model application device shown in FIG. 13. The model application device is provided with a camera, and the camera faces a driver. The camera may be fixed above a vehicle operation platform or in another position. The model application device stores the target key point convolutional neural network model in the embodiments of this application.

The camera of the model application device may collect a photo of a face of the driver or shoot the driver; process, by using the image processing method in this application, the photo or each frame of image in a video obtained through shooting, to position a face key point of the driver; and then determine, based on the face key point, whether to send an alarm signal.

For example, an implementation of determining, based on the face key point, whether to send the alarm signal may be: determining a driver behavior based on the face key point, and determining whether the driver behavior meets a preset condition. The preset condition may include that the driver frequently nods, eye closing duration exceeds preset duration, and the like. Based on the face key point, it may be determined whether the driver has an eye-closing, nodding, or yawning behavior, so as to determine whether the driver is in a fatigue driving state. When the fatigue state of the driver poses a threat to driving, an alarm is given to the driver. For example, the alarm signal may trigger a speaker to play an alert tone, or trigger a steering wheel to vibrate.

Scenario 2: A Video Application Interaction System

Figure 14A:
FIG. 14A to FIG. 14C are schematic diagrams of an interface in an application scenario of an image processing method according to an embodiment of this application.
Figure 14B:
Figure 14C:
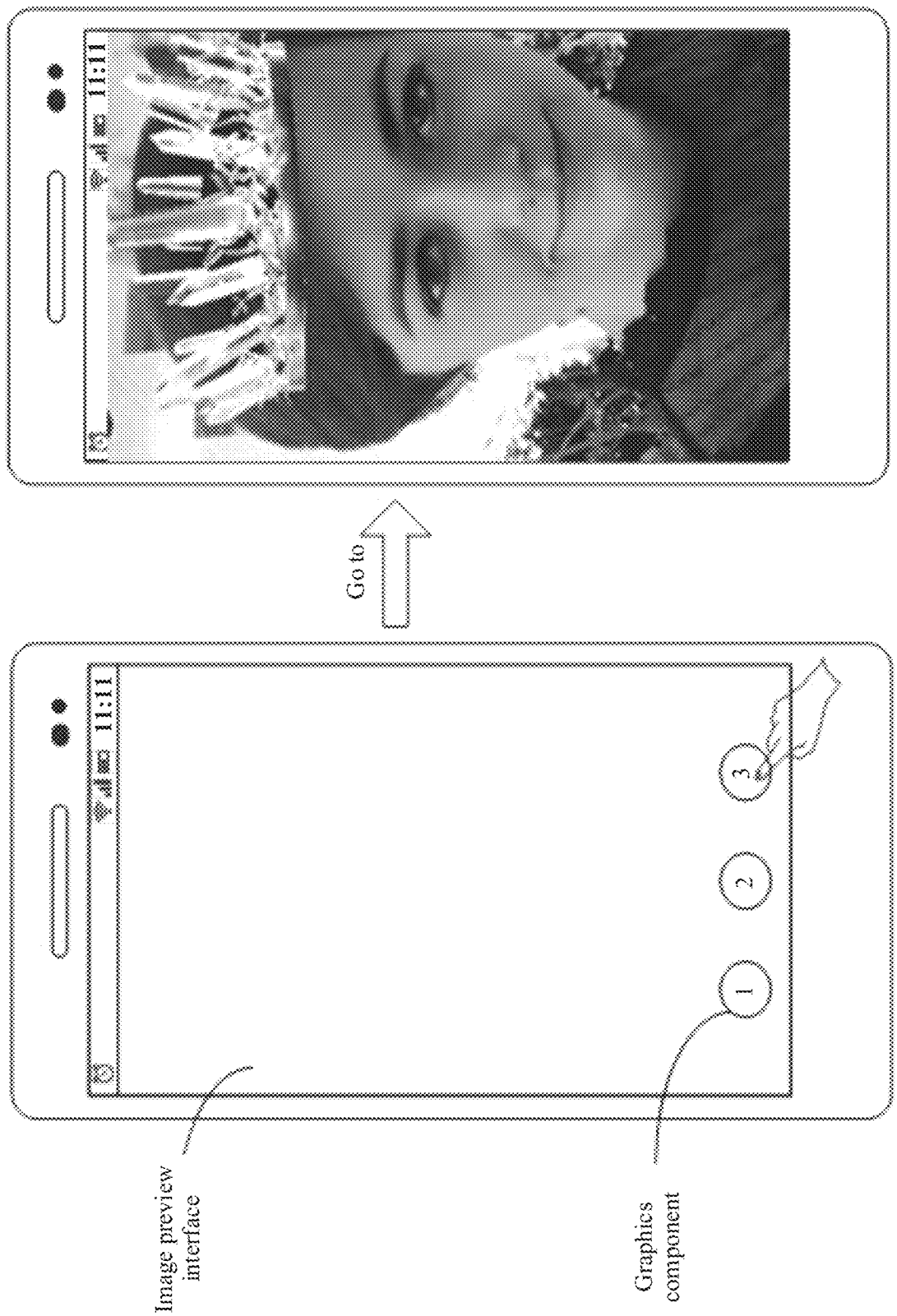

FIG. 14A to FIG. 14C are schematic diagrams of an interface in an application scenario of the image processing method according to an embodiment of this application. In this embodiment, the image processing method may be applied to a model application device, and the model application device may be any terminal described above. The model application device is provided with a client (for example, an APP). The client collects a face image through a camera of the model application device, and determines a face key point by using the image processing method in the embodiments of this application, to further implement interactive operations such as virtual makeup and wearing decoration based on the face key point. For example, the model application device displays an image preview interface of the client. The image preview interface may be an interface on the left of any one of FIG. 14A to FIG. 14C. The client collects the face image through the camera of the model application device, and determines the face key point by using the image processing method in the embodiments of this application. The client adjusts a to-be-processed image based on the coordinates of the face key point and a beauty effect parameter, and displays an adjusted to-be-processed image on the image preview interface. The adjusted to-be-processed image may be an interface on the right of any one of FIG. 14A to FIG. 14C. The beauty effect parameter includes at least one or a combination of a virtual decoration parameter, a face slimming parameter, an eye-size adjustment parameter, a skin smoothing and acne removal parameter, a skin whitening parameter, a tooth whitening parameter, and a blush parameter.

The beauty effect parameter is determined based on a trigger instruction input by a user. As shown on the interface on the left of any one of FIG. 14A to FIG. 14C, the image preview interface includes a plurality of graphic components, and each image component is configured to trigger a beauty effect. For example, a first image component is configured to trigger adding a virtual decoration 1, a second image component is configured to trigger adding of a virtual decoration 2, and a third image component is configured to trigger adding of a virtual decoration 3. When the user taps the first image component, in response to a trigger instruction corresponding to the operation of the user, the image preview interface switches to the interface shown on the right of FIG. 14A. To be specific, a virtual decoration of rabbit ears is added to a forehead part of the face image, and a virtual decoration of a rabbit nose is added to a nose part of the face image. When the user taps the second image component, in response to a trigger instruction corresponding to the operation of the user, the image preview interface switches to the interface shown on the right of FIG. 14B. To be specific, a virtual decoration of glasses is added to an eye part of the face image, and a virtual decoration of mathematical symbols is added to a background area of the face image. When the user taps the third image component, in response to a trigger instruction corresponding to the operation of the user, the image preview interface switches to the interface shown on the right of FIG. 14C. To be specific, a virtual decoration of a crown is added to a forehead part of the face image.

Optionally, before the adjusted to-be-processed image is displayed, a key point face image may further be obtained based on the coordinates of the face key point and the face image, where the key point face image is labeled with the face key point. The key point face image is displayed on the image preview interface, and a key point adjustment instruction input by the user is received. The key point adjustment instruction is used to indicate an adjusted face key point. The to-be-processed image is adjusted based on the adjusted face key point and the beauty effect parameter.

According to the image processing method in the embodiments of this application, the face key point can be accurately positioned, so that the beauty effect can be improved.

Optionally, before the adjusted to-be-processed image is displayed, a key point face image may further be obtained based on the coordinates of the face key point and the face image, where the key point face image is labeled with the face key point. The key point face image is displayed on the image preview interface, and a key point adjustment instruction input by the user is received. The key point adjustment instruction is used to indicate an adjusted face key point. The to-be-processed image is adjusted based on the adjusted face key point and the beauty effect parameter.

Scenario 3: Facial Recognition in Video Surveillance

In the video surveillance, an identity of a person may generally be determined based on a face. Generally, a person has different posture angles. Therefore, it is relatively difficult for a facial recognition module to extract a feature. According to the image processing method in the embodiments of this application, a face key point can be accurately determined. In this way, difficulty of a facial recognition algorithm is greatly reduced and a recognition capability of the algorithm is improved.

For example, a camera in a video surveillance system may collect a to-be-processed image, obtain a face image, process the face image by using the image processing method in the embodiments of this application, and output coordinates of a face key point of the face image. The facial recognition module may perform feature extraction on the face image based on the coordinates of the face key point, to obtain a face image feature; match the face image features with a feature template in a database; and output a recognition result.

It should be noted that the image processing method provided in this application is not only applicable to an application scenario in which a terminal device performs shooting by using a front-facing camera sensor, but also applicable to an application scenario in which a terminal device performs shooting by using a rear-facing camera sensor. Similarly, the method in this application is also applicable to an application scenario in which a terminal device performs shooting by using a dual-camera sensor. In any application scenario, the terminal device may process an image output by the camera sensor by using the method steps in step 301 and step 302, step 401 to step 404, or step 501 to step 504.

It may be understood that, in the foregoing embodiments, the methods or the steps implemented by the terminal device may be alternatively implemented by a chip inside the terminal device.

Figure 15:
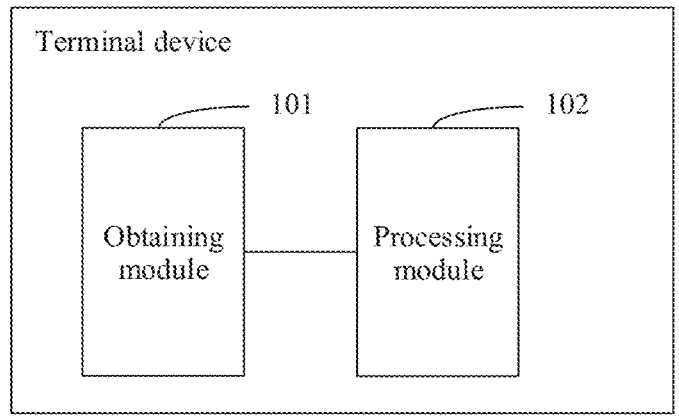
FIG. 15 is a schematic diagram of a structure of a terminal device according to an embodiment of this application.

FIG. 15 is a schematic diagram of a structure of a terminal device according to an embodiment of this application. As shown in FIG. 15, the terminal device may include:

an obtaining module 101, configured to obtain a face image; and a processing module 102, configured to separately obtain a left face image and a right face image based on the face image, where sizes of the left face image and the right face image are the same as a size of the face image.

The processing module 102 is further configured to: input the left face image into a first target key point convolutional neural network model, and output coordinates of a first left face key point, where the first target key point convolutional neural network model is obtained after a key point convolutional neural network model is trained by using a left face image having key point information.

The processing module 102 is further configured to: input the right face image into a second target key point convolutional neural network model, and output coordinates of a first right face key point, where the second target key point convolutional neural network model is obtained after a key point convolutional neural network model is trained by using a right face image having key point information.

The processing module 102 is further configured to obtain coordinates of a face key point of the face image based on the coordinates of the first left face key point and the coordinates of the first right face key point.

In some embodiments, the left face image having key point information and the right face image having key point information are obtained based on face images having different posture information. The face images having different posture information have corresponding key point information. The face images having different posture information include a face image having first posture information, a face image having second posture information, and a face image having third posture information. The first posture information is posture information used to indicate that a direction of a deflection angle of a face is leftward. The second posture information is posture information used to indicate that a direction of the deflection angle of the face is forward. The third posture information is posture information used to indicate that a direction of the deflection angle of the face is rightward.

In some embodiments, the processing module 102 is configured to: determine a first affine transformation matrix based on the coordinates of the first left face key point; obtain a corrected left face image based on the first affine transformation matrix and the left face image; input the corrected left face image into a third target key point convolutional neural network model, and output corrected coordinates of the first left face key point; obtain coordinates of a second left face key point based on the corrected coordinates of the first left face key point and an inverse transformation of the first affine transformation matrix; and obtain the coordinates of the face key point of the face image based on the coordinates of the second left face key point and the coordinates of the first right face key point.

In some embodiments, the processing module 102 is configured to: determine a second affine transformation matrix based on the coordinates of the first right face key point; obtain a corrected right face image based on the second affine transformation matrix and the right face image; input the corrected right face image into a fourth target key point convolutional neural network model, and output corrected coordinates of the first right face key point, obtain coordinates of a second right face key point based on the corrected coordinates of the first right face key point and an inverse transformation of the second affine transformation matrix; and obtain the coordinates of the face key point of the face image based on the coordinates of the second right face key point and the coordinates of the first left face key point.

In some embodiments, the processing module 102 is configured to: determine a first affine transformation matrix based on the coordinates of the first left face key point; obtain a corrected left face image based on the first affine transformation matrix and the left face image; determine a second affine transformation matrix based on the coordinates of the first right face key point; obtain a corrected right face image based on the second affine transformation matrix and the right face image; input the corrected left face image into a third target key point convolutional neural network model, and output corrected coordinates of the first left face key point; obtain coordinates of a second left face key point based on the corrected coordinates of the first left face key point and an inverse transformation of the first affine transformation matrix, input the corrected right face image into a fourth target key point convolutional neural network model, and output corrected coordinates of the first right face key point; obtain coordinates of a second right face key point based on the corrected coordinates of the first right face key point and an inverse transformation of the second affine transformation matrix; and obtain the coordinates of the face key point of the face image based on the coordinates of the second left face key point and the coordinates of the second right face key point.

In some embodiments, the obtaining module 101 is further configured to: classify a plurality of training samples based on the posture information, to obtain s training sample sets, where the training samples include the face image having key point information; select a plurality of training samples from at least three of the s training sample sets as training data; and train two key point convolutional neural network models by using the training data, to obtain the first target key point convolutional neural network model and the second target key point convolutional neural network model, where s is any integer greater than or equal to 3.

In some embodiments, the obtaining module 101 is further configured to: collect a to-be-processed image by using a photographing function or a shooting function of the terminal; and capture the face image from the to-be-processed image.

The terminal device provided in this application may perform the foregoing method embodiment, and their implementation principles and technical effects are similar. Details are not described herein again.

Figure 16:
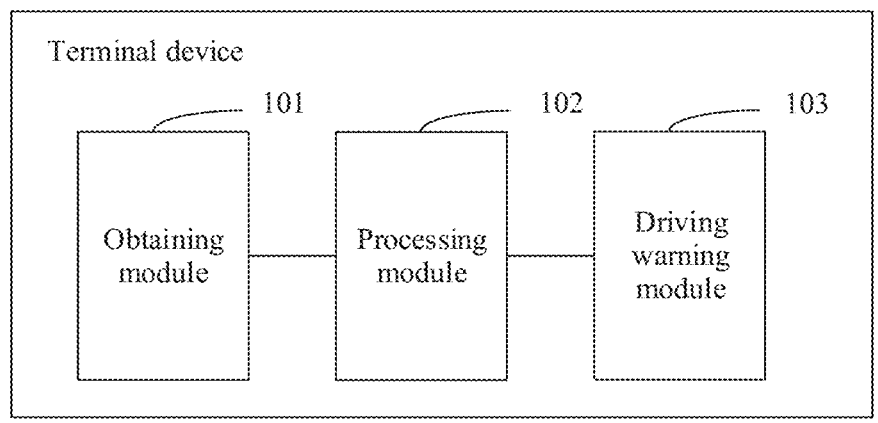
FIG. 16 is a schematic diagram of a structure of another terminal device according to an embodiment of this application.

In some embodiments, FIG. 16 is a schematic diagram of a structure of another terminal device according to an embodiment of this application. As shown in FIG. 16, based on the block diagram shown in FIG. 15, the terminal device may further include a driving warning module 103, configured to: determine a driver behavior based on the coordinates of the face key point, and determine, based on the driver behavior, whether to send an alarm signal.

Figure 17:
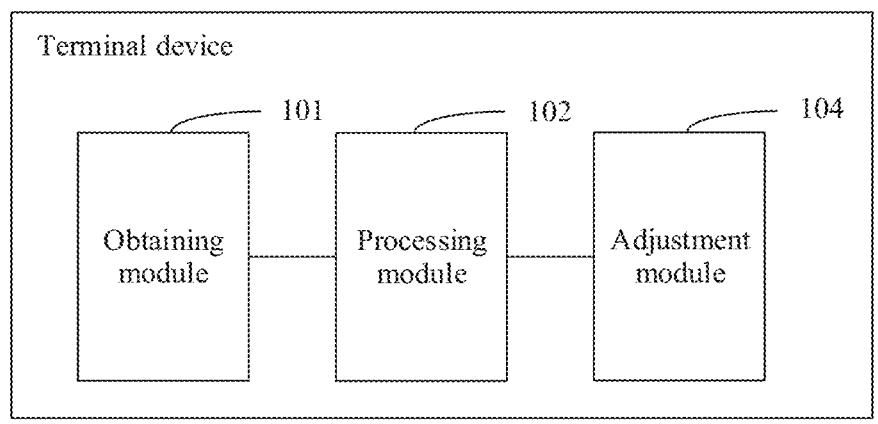
FIG. 17 is a schematic diagram of a structure of another terminal device according to an embodiment of this application.

In some embodiments, FIG. 17 is a schematic diagram of a structure of another terminal device according to an embodiment of this application. As shown in FIG. 17, based on the block diagram shown in FIG. 15, the terminal device may further include an adjustment module 104, configured to adjust the to-be-processed image based on the coordinates of the face key point and a beauty effect parameter, and display an adjusted to-be-processed image on an image preview interface. The beauty effect parameter includes at least one or a combination of a virtual decoration parameter, a face slimming parameter, an eye-size adjustment parameter, a skin smoothing and acne removal parameter, a skin whitening parameter, a tooth whitening parameter, and a blush parameter.

In some embodiments, the adjustment module 104 is further configured to: obtain a key point face image based on the coordinates of the face key point and the face image, where the key point face image is labeled with the face key point; and display the key point face image on the image preview interface. The adjustment module 104 is further configured to: receive a key point adjustment instruction input by a user, where the key point adjustment instruction is used to indicate an adjusted face key point, and adjust the to-be-processed image based on the adjusted face key point and the beauty effect parameter.

Figure 18:
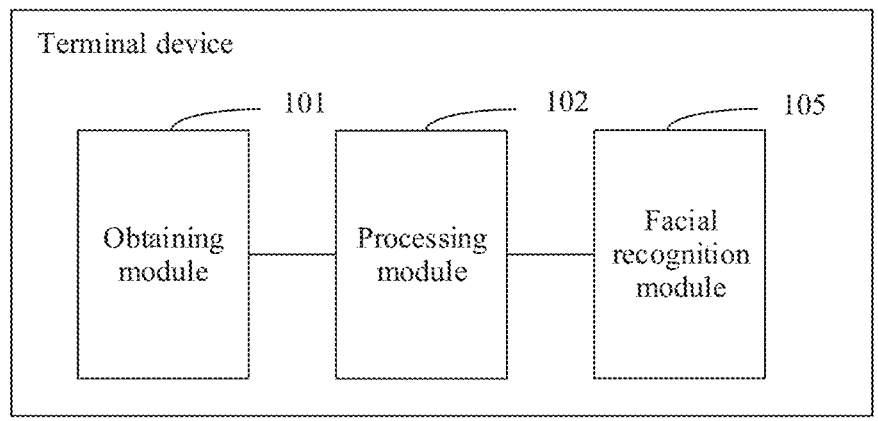
FIG. 18 is a schematic diagram of a structure of another terminal device according to an embodiment of this application.

In some embodiments, FIG. 18 is a schematic diagram of a structure of another terminal device according to an embodiment of this application. As shown in FIG. 18, based on the block diagram shown in FIG. 15, the terminal device may further include a facial recognition module 105, configured to perform facial recognition based on the coordinates of the face key point.

In some embodiments, the facial recognition module 105 is configured to: perform feature extraction on the face image based on the coordinates of the face key point, to obtain a face image feature; match the face image feature with a feature template in a database; and output a recognition result.

The terminal device provided in this application may perform the foregoing method embodiment, and their implementation principles and technical effects are similar. Details are not described herein again.

Figure 19:
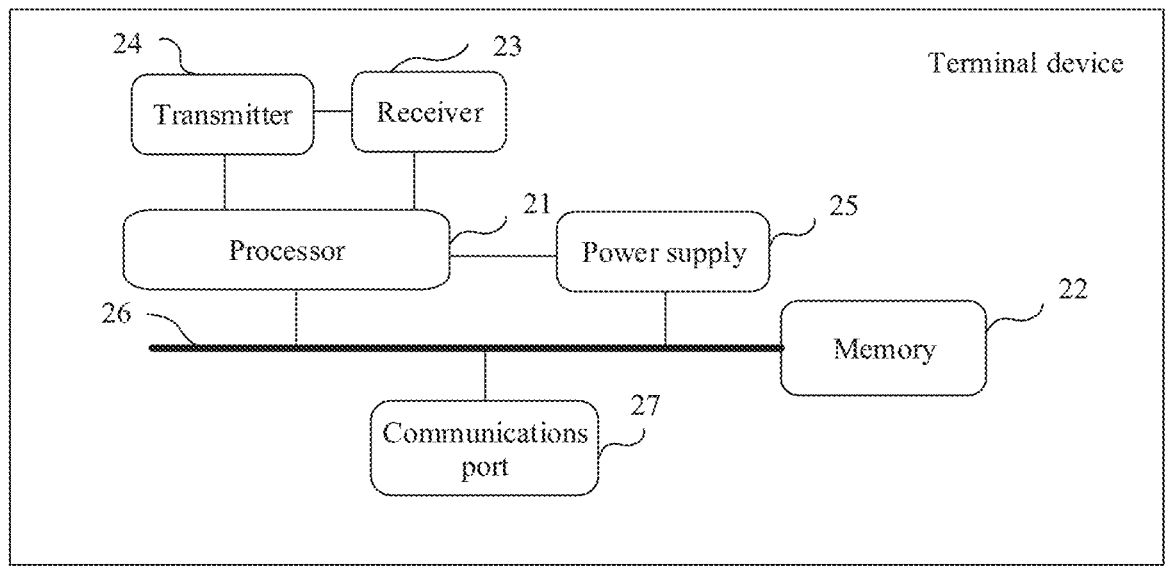
FIG. 19 is a schematic diagram of a structure of another terminal device according to an embodiment of this application.

FIG. 19 is a schematic diagram of a structure of another terminal device according to an embodiment of this application. As shown in FIG. 19, the terminal device may include a processor 21 (for example, a CPU) and a memory 22. The memory 22 may include a high-speed RAM memory, or may further include a nonvolatile memory NVM, for example, at least one magnetic disk storage. The memory 22 may store various instructions, to complete various processing functions and implement the method steps in this application. Optionally, the terminal device in this application may further include a receiver 23, a transmitter 24, a power supply 25, a communications bus 26, and a communications port 27. The receiver 23 and the transmitter 24 may be integrated into a transceiver of the terminal device, or may be independent transceiver antennas on the terminal device. The communications bus 26 is configured to implement a communication connection between elements. The communications port 27 is configured to implement connection and communication between the terminal device and another peripheral.

In this application, the memory 22 is configured to store computer-executable program code. The program code includes instructions. When the processor 21 executes the instructions, the instructions enable the terminal device to perform the foregoing method embodiments. Implementation principles and technical effects thereof are similar. Details are not described herein.

Figure 20:
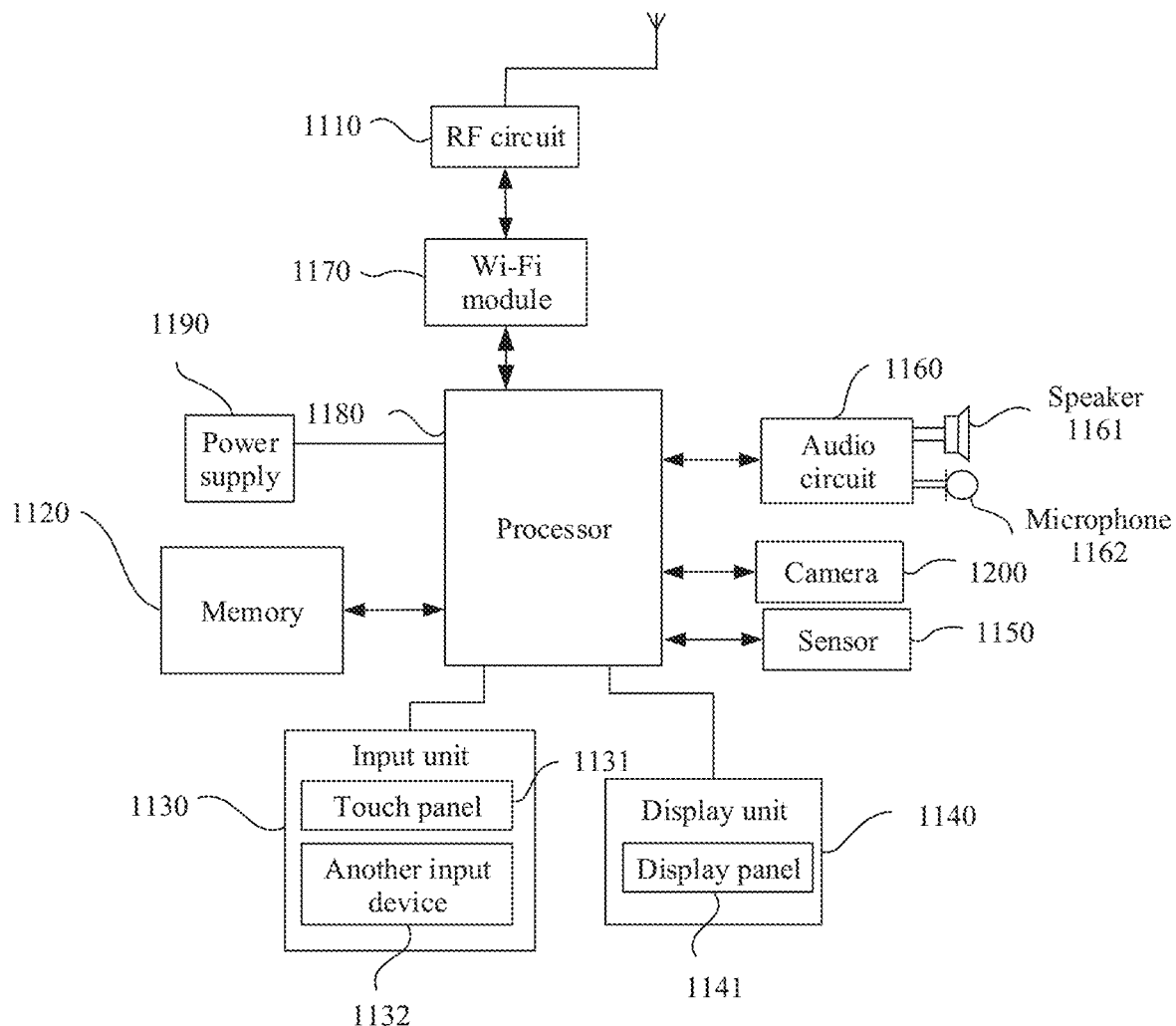
FIG. 20 is a block diagram of a structure of a terminal device when the terminal device is a mobile phone according to an embodiment of this application.

As described in the foregoing embodiments, the terminal device in this application may be a wireless terminal, for example, a mobile phone or a tablet computer. Therefore, an example in which the terminal device is a mobile phone is used. FIG. 20 is a block diagram of a structure of the terminal device when the terminal device in this embodiment of this application is a mobile phone. Refer to FIG. 20. The mobile phone may include components such as a radio frequency (Radio Frequency, RF) circuit 1110, a memory 1120, an input unit 1130, a display unit 1140, a sensor 1150, an audio circuit 1160, a wireless fidelity (wireless fidelity, Wi-Fi) module 1170, a processor 1180, and a power supply 1190. Persons skilled in the art may understand that the structure of the mobile phone shown in FIG. 20 does not constitute a limitation on the mobile phone, and the mobile phone may include more or fewer components than those shown in the figure, or some components may be combined, or a different component deployment may be used.

The following describes the components of the mobile phone in detail with reference to FIG. 20.

The RF circuit 1110 may be configured to receive and send signals in an information receiving and sending process or a call process. For example, after receiving downlink information from a base station, the RF circuit 1110 sends the downlink information to the processor 1180 for processing; and sends uplink data to the base station. Generally, the RF circuit includes but is not limited to an antenna, at least one amplifier, a transceiver, a coupler, a low noise amplifier (Low Noise Amplifier, LNA), a duplexer, and the like. In addition, the RF circuit 1110 may further communicate with a network and another device through wireless communication. The wireless communication may use any communications standard or protocol, including but not limited to a global system for mobile communications (Global System for Mobile communications, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (Short Message Service, SMS), and the like.

The memory 1120 may be configured to store a software program and a module. The processor 1180 executes various function applications of the mobile phone and processes data by running the software program and the module that are stored in the memory 1120. The memory 1120 may mainly include a program storage area and a data storage area. The program storage area may store an operating system, an application required by at least one function (such as a voice playing function and an image playing function), and the like. The data storage area may store data (such as audio data and a phone book) that is created based on use of the mobile phone, and the like. In addition, the memory 1120 may include a high-speed random access memory, and may further include a nonvolatile memory such as at least one magnetic disk storage device, a flash storage device, or another volatile solid-state storage device.

The input unit 1130 may be configured to: receive entered digit or character information, and generate a key signal input related to a user setting and function control of the mobile phone. Specifically, the input unit 1130 may include a touch panel 1131 and another input device 1132. The touch panel 1131, also referred to as a touchscreen, may collect a touch operation (for example, an operation performed by a user on or near the touch panel 1131 by using any suitable object or accessory such as a finger or a stylus) performed by the user on or near the touch panel 1131, and may drive a corresponding connection apparatus based on a preset program. Optionally, the touch panel 1131 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch point coordinates, sends the touch point coordinates to the processor 1180, and receives and executes a command sent by the processor 1180. In addition, the touch panel 1131 may be implemented in a plurality of types, such as a resistive type, a capacitive type, an infrared type, and a surface acoustic wave type. The input unit 1130 may further include the another input device 1132 in addition to the touch panel 1131. Specifically, the another input device 1132 may include but is not limited to one or more of a physical keyboard, a function button (for example, a volume control button or a power on/off button), a trackball, a mouse, a joystick, and the like.

The display unit 1140 may be configured to display information entered by the user or information provided for the user, and various menus of the mobile phone. The display unit 1140 may include a display panel 1141. Optionally, the display panel 1141 may be configured in a form of a liquid crystal display (Liquid Crystal Display, LCD), an organic light-emitting diode (Organic Light-Emitting Diode, OLED), or the like. Further, the touch panel 1131 may cover the display panel 1141. After the touch panel 1131 detects a touch operation on or near the touch panel 1131, the touch operation is transmitted to the processor 1180 to determine a type of a touch event. Then, the processor 1180 provides a corresponding visual output on the display panel 1141 based on the type of the touch event. In FIG. 10, the touch panel 1131 and the display panel 1141 are used as two independent components to implement input and input functions of the mobile phone. However, in some embodiments, the touch panel 1131 and the display panel 1141 may be integrated to implement the input and output functions of the mobile phone.

The mobile phone may further include at least one sensor 1150, for example, an optical sensor, a motion sensor, and another sensor. Specifically, the optical sensor may include an ambient light sensor and a proximity sensor. The ambient light sensor may adjust luminance of the display panel 1141 based on brightness of ambient light. When the mobile phone approaches an ear, the optical sensor may turn off the display panel 1141 and/or backlight. As a type of motion sensor, an acceleration sensor may detect values of accelerations in directions (usually three axes), may detect, in a static state, a value and a direction of gravity, and may be used for an application that identifies a posture (for example, screen switching between a landscape mode and a portrait mode, a related game, and magnetometer posture calibration) of the mobile phone, a vibration-identification-related function (for example, a pedometer and tapping), and the like. Other sensors that can be configured on the mobile phone such as a gyroscope, a barometer, a hygrometer, a thermometer, and an infrared sensor are not described herein.

The audio circuit 1160, a speaker 1161, and a microphone 1162 may provide an audio interface between the user and the mobile phone. The audio circuit 1160 may convert received audio data into an electrical signal, and then transmit the electrical signal to the speaker 1161, and the speaker 1161 converts the electrical signal into a sound signal for output. In addition, the microphone 1162 converts a collected sound signal into an electrical signal. The audio circuit 1160 receives the electrical signal, converts the electrical signal into audio data, and then outputs the audio data to the processor 1180 for processing. After the processing, the processor 1180 sends the audio data to, for example, another mobile phone through the RF circuit 1110, or outputs the audio data to the memory 1120 for further processing.

Wi-Fi is a short-distance wireless transmission technology. With the Wi-Fi module 1170, the mobile phone may help the user send and receive an email, browse a web page, access streaming media, and the like. The Wi-Fi module 1170 provides wireless access to the broadband internet for the user. Although FIG. 20 shows the Wi-Fi module 1170, it may be understood that the Wi-Fi module 1170 is not a mandatory component of the mobile phone, and may be omitted based on a requirement without changing the essence of this application.

The processor 1180 is a control center of the mobile phone, connects various components of the entire mobile phone through various interfaces and lines, and executes various functions and processes data of the mobile phone by running or executing the software program and/or the module stored in the memory 1120 and invoking data stored in the memory 1120, to perform overall monitoring on the mobile phone. Optionally, the processor 1180 may include one or more processing units. For example, an application processor and a modem processor may be integrated into the processor 1180, where the application processor mainly processes an operating system, a user interface, an application program, or the like, and the modem processor mainly processes wireless communication. It may be understood that the modem processor may alternatively not be integrated into the processor 1180.

The mobile phone further includes the power supply 1190 (such as a battery) that supplies power to each component. Optionally, the power supply may be logically connected to the processor 1180 by using a power management system, so that functions such as management of charging, discharging, and power consumption are implemented by using the power management system.

The mobile phone may further include a camera 1200. The camera may be a front-facing camera or a rear-facing camera. Although not shown, the mobile phone may further include a Bluetooth module, a GPS module, and the like. Details are not described herein.

In this application, the processor 1180 included in the mobile phone may be configured to perform the foregoing embodiments of the image processing method, and have similar implementation principles and technical effects. Details are not described herein again.

Figure 21:
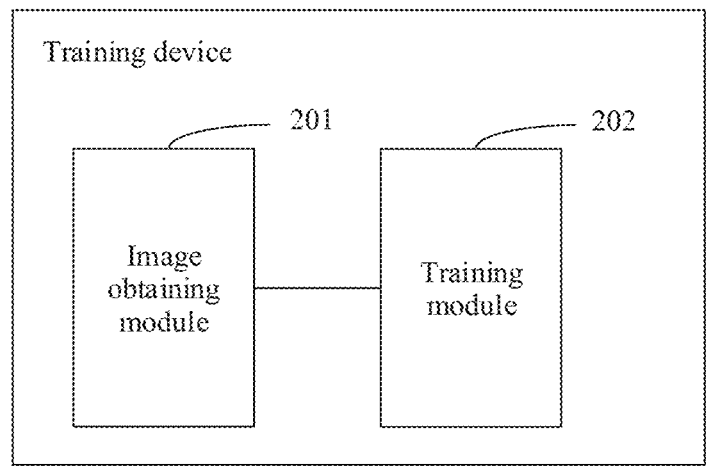
FIG. 21 is a schematic diagram of a structure of a training device according to an embodiment of this application.

FIG. 21 is a schematic diagram of a structure of a training device according to an embodiment of this application. As shown in FIG. 21, the training device in this embodiment may include an image obtaining module 201, configured to obtain, based on face images having different posture information, a left face image having key point information and a right face image having key point information, where the face images having different posture information have corresponding key point information; and a training module 202, configured to: train a key point convolutional neural network model by using the left face image having key point information, to obtain a first target key point convolutional neural network model, where the first target key point convolutional neural network model is used to process an input left face image and output coordinates of a left face key point; and train a key point convolutional neural network model by using the right face image having key point information, to obtain a second target key point convolutional neural network model, where the second target key point convolutional neural network model is used to process an input right face image and output coordinates of a right face key point. The posture information is used to reflect a deflection angle of a face.

In some embodiments, the face images having different posture information include a face image having first posture information, a face image having second posture information, and a face image having third posture information. The first posture information is posture information used to indicate that a direction of the deflection angle of the face is leftward. The second posture information is posture information used to indicate that a direction of the deflection angle of the face is forward. The third posture information is posture information used to indicate that a direction of the deflection angle of the face is rightward.

In some embodiments, the image obtaining module 201 is further configured to: classify a plurality of training samples based on the posture information, to obtain s training sample sets, where the training samples include the face image having key point information; and select a plurality of training samples from at least three of the s training sample sets as the face images having different posture information.

The training device described in this embodiment may be configured to execute the technical solutions executed by the training device/chip of the training device or the application server/chip of the application server in the foregoing embodiments. Implementation principles and technical effects thereof are similar. For functions of the modules, refer to corresponding descriptions in the method embodiments. Details are not described herein again.

Figure 22:
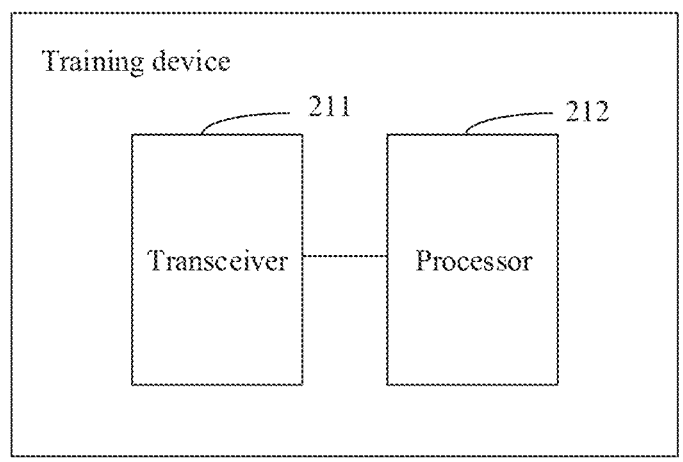
FIG. 22 is a schematic diagram of a structure of another training device according to an embodiment of this application.

FIG. 22 is a schematic diagram of a structure of another training device according to an embodiment of this application. As shown in FIG. 22, the training device in this embodiment includes a transceiver 211 and a processor 212.

The transceiver 211 may include a necessary radio frequency communications device, for example, a frequency mixer. The processor 212 may include at least one of a CPU, a DSP, an MCU, an ASIC, or an FPGA.

Optionally, the training device in this embodiment may further include a memory 213. The memory 213 is configured to store program instructions, and the transceiver 211 is configured to invoke the program instructions in the memory 213 to execute the foregoing solutions.

The training device described in this embodiment may be configured to execute the technical solutions executed by the training device/chip of the training device or the application server/chip of the application server in the foregoing method embodiments. Implementation principles and technical effects thereof are similar. For functions of the components, refer to corresponding descriptions in the method embodiments. Details are not described herein again.

Figure 23:
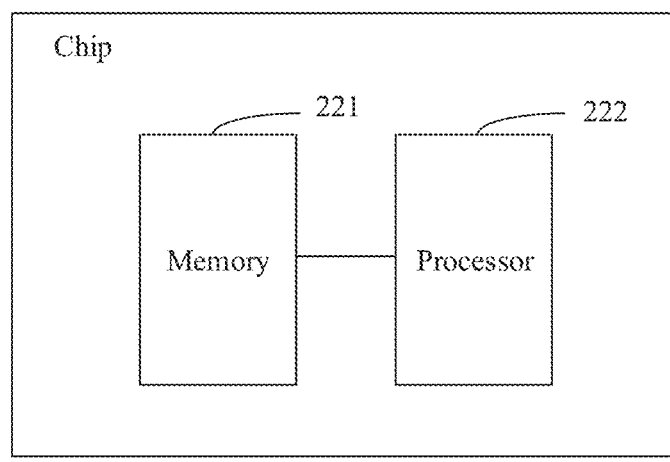
FIG. 23 is a schematic diagram of a structure of a chip according to an embodiment of this application.

FIG. 23 is a schematic diagram of a structure of a chip according to an embodiment of this application. As shown in FIG. 23, the chip in this embodiment may be used as a chip of a training device or a chip of an application server. The chip in this embodiment may include a memory 221 and a processor 222. The memory 221 is communicatively connected to the processor 222. The processor 222 may include, for example, at least one of a CPU, a DSP, an MCU, an ASIC, or an FPGA.

In a hardware implementation, the foregoing function modules may be embedded in or independent of the processor 222 of the chip in a form of hardware.

The memory 221 is configured to store program instructions, and the processor 222 is configured to invoke the program instructions in the memory 221 to execute the foregoing solutions.

The program instructions may be implemented in a form of a software functional unit and can be sold or used as an independent product. The memory may be a computer-readable storage medium in any form. Based on such understanding, all or some of the technical solutions of this application may be embodied in a form of a software product, and the software product includes several instructions for instructing a computer device, which may be specifically the processor 222, to perform all or some of the steps of the network device in the embodiments of this application. The foregoing computer-readable storage medium includes any medium that can store program code, such as a USB flash drive, a removable hard disk, a ROM, a RAM, a magnetic disk, or an optical disc.

The chip described in this embodiment may be configured to implement the technical solutions implemented by the training device or the chip in the training device in the foregoing method embodiments of this application. Implementation principles and technical effects thereof are similar. For functions of the modules, refer to corresponding descriptions in the method embodiments. Details are not described herein again.

It should be noted that, in this embodiment of this application, division into the modules is an example, and is merely logical function division. In actual implementation, another division manner may be used. Function modules in the embodiments of this application may be integrated into one processing module, or each of the modules may exist alone physically, or two or more modules are integrated into one module. The integrated module may be implemented in a form of hardware, or may be implemented in a form of a software function module.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

What is claimed is:

1. An image processing method, comprising:
   obtaining a face image;
   separately obtaining a left face image and a right face image based on the face image, wherein sizes of the left face image and the right face image are the same as a size of the face image;
   inputting the left face image into a first target key point convolutional neural network model, and outputting coordinates of a first left face key point, wherein the first target key point convolutional neural network model is obtained after a first key point convolutional neural network model is trained by using a training left face image having key point information;
   inputting the right face image into a second target key point convolutional neural network model, and outputting coordinates of a first right face key point, wherein the second target key point convolutional neural network model is obtained after a second key point convolutional neural network model is trained by using a training right face image having key point information; and
   obtaining coordinates of a face key point of the face image based on the coordinates of the first left face key point and the coordinates of the first right face key point, wherein obtaining the coordinates of the face key point of the face image based on the coordinates of the first left face key point and the coordinates of the first right face key point comprises:
      determining a first affine transformation matrix based on the coordinates of the first left face key point;
      obtaining a corrected left face image based on the first affine transformation matrix and the left face image;
      inputting the corrected left face image into a third target key point convolutional neural network model, and outputting corrected coordinates of the first left face key point;
      obtaining coordinates of a second left face key point based on the corrected coordinates of the first left face key point and an in verse transformation of the first affine transformation matrix; and
      obtaining the coordinates of the face key point of the face image based on the coordinates of the second left face key point and the coordinates of the first right face key point.

2. The method according to claim 1, wherein the training left face image having key point information and the training right face image having key point information are obtained based on face images having different posture information, the face images having different posture information have corresponding key point information, the face images having different posture information comprise a face image having first posture information, a face image having second posture information, and a face image having third posture information, the first posture information is posture information used to indicate that a direction of a deflection angle of a face is leftward, the second posture information is posture information used to indicate that a direction of the deflection angle of the face is forward, and the third posture information is posture information used to indicate that a direction of the deflection angle of the face is rightward.

3. The method according to claim 2, wherein the method further comprises:
classifying a first plurality of training samples based on the different posture information to obtain s training sample sets, wherein the first plurality of training samples comprise face images having key point information;
selecting a second plurality of training samples from at least three of the s training sample sets as training data; and
training two key point convolutional neural network models by using the training data to obtain the first target key point convolutional neural network model and the second target key point convolutional neural network model, wherein s is any integer greater than or equal to 3.

4. The method according to claim 1, wherein obtaining the coordinates of the face key point of the face image based on the coordinates of the first left face key point and the coordinates of the first right face key point comprises:
determining a second affine transformation matrix based on the coordinates of the first right face key point;
obtaining a corrected right face image based on the second affine transformation matrix and the right face image;
inputting the corrected right face image into a fourth target key point convolutional neural network model, and outputting corrected coordinates of the first right face key point;
obtaining coordinates of a second right face key point based on the corrected coordinates of the first right face key point and an inverse transformation of the second affine transformation matrix; and
obtaining the coordinates of the face key point of the face image based on the coordinates of the second right face key point and the coordinates of the first left face key point.

5. The method according to claim 1, wherein obtaining the face image comprises:
collecting a to-be-processed image by using a photographing function or a shooting function of a terminal; and
capturing the face image from the to-be-processed image.

6. The method according to claim 5, wherein the method further comprises:
determining a driver behavior based on the coordinates of the face key point; and
determining, based on the driver behavior, whether to send an alarm signal.

7. The method according to claim 5, wherein the method further comprises:
adjusting the to-be-processed image based on the coordinates of the face key point and a beauty effect parameter; and
displaying an adjusted to-be-processed image on an image preview interface, wherein the beauty effect parameter comprises at least one of a virtual decoration parameter, a face slimming parameter, an eye-size adjustment parameter, a skin smoothing and acne removal parameter, a skin whitening parameter, a tooth whitening parameter, or a blush parameter.

8. The method according to claim 7, wherein before displaying the adjusted to-be-processed image, the method further comprises:
obtaining a key point face image based on the coordinates of the face key point and the face image, wherein the key point face image is labeled with the face key point;
displaying the key point face image on the image preview interface; and
receiving a key point adjustment instruction input by a user, wherein the key point adjustment instruction is used to indicate an adjusted face key point; and
wherein adjusting the to-be-processed image based on the coordinates of the face key point and the beauty effect parameter comprises:
adjusting the to-be-processed image based on the adjusted face key point and the beauty effect parameter.

9. The method according to claim 5, wherein the method further comprises:
performing facial recognition based on the coordinates of the face key point.

10. The method according to claim 9, wherein performing the facial recognition based on the coordinates of the face key point comprises:
performing feature extraction on the face image based on the coordinates of the face key point to obtain a face image feature; and
matching the face image feature with a feature template in a database, and outputting a recognition result.

11. An image processing apparatus, comprising:
at least one processor; and
one or more memories coupled to the at least one processor and storing programming instructions for execution by the at least one processor to:
obtain a face image;
separately obtain a left face image and a right face image based on the face image, wherein sizes of the left face image and the right face image are the same as a size of the face image;
input the left face image into a first target key point convolutional neural network model, and output coordinates of a first left face key point, wherein the first target key point convolutional neural network model is obtained after a first key point convolutional neural network model is trained by using a training left face image having key point information;
input the right face image into a second target key point convolutional neural network model, and output coordinates of a first right face key point, wherein the second target key point convolutional neural network model is obtained after a second key point convolutional neural network model is trained by using a training right face image having key point information; and
obtain coordinates of a face key point of the face image based on the coordinates of the first left face key point and the coordinates of the first right face key point, wherein obtaining the coordinates of the face key point of the face image based on the coordinates of the first left face key point and the coordinates of the first right face key point comprises:
determining a first affine transformation matrix based on the coordinates of the first left face key point;
obtaining a corrected left face image based on the first affine transformation matrix and the left face image;
inputting the corrected left face image into a third target key point convolutional neural network model, and outputting corrected coordinates of the first left face key point;

obtaining coordinates of a second left face key point based on the corrected coordinates of the first left face key point and an inverse transformation of the first affine transformation matrix; and obtaining the coordinates of the face key point of the face image based on the coordinates of the second left face key point and the coordinates of the first right face key point.

12. The apparatus according to claim 11, wherein the training left face image having key point information and the training right face image having key point information are obtained based on face images having different posture information, the face images having different posture information have corresponding key point information, the face images having different posture information comprise a face image having first posture information, a face image having second posture information, and a face image having third posture information, the first posture information is posture information used to indicate that a direction of a deflection angle of a face is leftward, the second posture information is posture information used to indicate that a direction of the deflection angle of the face is forward, and the third posture information is posture information used to indicate that a direction of the deflection angle of the face is rightward.

* * * * *

UNITED STATES PATENT AND TRADEMARK OFFICE
CERTIFICATE OF CORRECTION

PATENT NO. : 12,136,210 B2
APPLICATION NO. : 17/530688
DATED : November 5, 2024
INVENTOR(S) : Yun Yang et al.

Page 1 of 1

It is certified that error appears in the above-identified patent and that said Letters Patent is hereby corrected as shown below:

In the Claims

In Column 36, In Line 46, In Claim 1, delete "in verse" and insert -- inverse --.

Signed and Sealed this
Fourth Day of March, 2025

Coke Morgan Stewart
*Acting Director of the United States Patent and Trademark Office*